(12) United States Patent
Ishigami et al.

(10) Patent No.: US 10,267,920 B2
(45) Date of Patent: Apr. 23, 2019

(54) POSITIONING METHOD

(75) Inventors: Tadatomi Ishigami, Tokyo (JP);
Atsushi Maeda, Tokyo (JP); Masatoshi Fujii, Tokyo (JP); Hirokazu Chiyonobu, Tokyo (JP); Kohei Fujimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 739 days.

(21) Appl. No.: 14/403,647

(22) PCT Filed: Jun. 27, 2012

(86) PCT No.: PCT/JP2012/066346
§ 371 (c)(1),
(2), (4) Date: Nov. 25, 2014

(87) PCT Pub. No.: WO2014/002210
PCT Pub. Date: Jan. 3, 2014

(65) Prior Publication Data
US 2015/0138015 A1    May 21, 2015

(51) Int. Cl.
*G01S 19/13* (2010.01)
*G01C 21/28* (2006.01)
(Continued)

(52) U.S. Cl.
CPC .............. *G01S 19/13* (2013.01); *G01C 21/28* (2013.01); *G01S 19/22* (2013.01); *G01S 19/42* (2013.01); *G01S 19/52* (2013.01)

(58) Field of Classification Search
CPC ........... G01S 19/52; G01S 19/22; G01S 19/49
See application file for complete search history.

(56) References Cited

U.S. PATENT DOCUMENTS 5,978,735 A    11/1999 Gu
6,959,240 B2   10/2005 Okamoto
(Continued)

FOREIGN PATENT DOCUMENTS

DE    196 45 528 A1    5/1998
EP    2 067 054        6/2009
(Continued)

OTHER PUBLICATIONS

International Search Report issued in PCT/JP2012/066346, dated Sep. 25, 2012.
(Continued)

*Primary Examiner* — Bernarr E Gregory
*Assistant Examiner* — Fred H Mull
(74) *Attorney, Agent, or Firm* — Birch, Stewart, Kolash & Birch, LLP

(57) ABSTRACT

An object is to provide in a positioning device of a moving body such as a vehicle, a technique which can modify a built-in clock error of a moving body to increase accuracy of a velocity. The positioning device includes a built-in clock error estimating unit which estimates a built-in clock error of the vehicle as a built-in clock error based on a difference between a delta range and a calculated range rate, and a range rate estimating unit which estimates a vehicle stop range rate based on position and velocity of GPS satellite based on transmission signal and a vehicle position, and modifies a calculated range rate, based on the built-in clock error. Further, the positioning device includes an own vehicle velocity calculating unit which calculates own vehicle velocities in three axial directions which form an orthogonal coordinate system, based on a navigation matrix, the vehicle stop range rate and the modified calculated range rate.

22 Claims, 14 Drawing Sheets

(51) Int. Cl.
    *G01S 19/42*     (2010.01)
    *G01S 19/52*     (2010.01)
    *G01S 19/22*     (2010.01)

(56) References Cited

U.S. PATENT DOCUMENTS

| | | |
|---|---|---|
| 7,978,127 B2 | 7/2011 | Ueda et al. |
| 7,987,047 B2 | 7/2011 | Ishigami et al. |
| 8,548,723 B2 | 10/2013 | Ishigami et al. |
| 2005/0107946 A1 | 5/2005 | Shimizu et al. |
| 2010/0026566 A1 | 2/2010 | Ueda et al. |
| 2011/0071755 A1* | 3/2011 | Ishigami ................. G01S 19/22 |
| | | 701/478.5 |

FOREIGN PATENT DOCUMENTS

| | | |
|---|---|---|
| JP | 10-111137 A | 4/1998 |
| JP | 3321096 B2 | 9/2002 |
| JP | 2003-307524 A | 10/2003 |
| JP | 3984112 B2 | 10/2007 |
| JP | 2008-249660 A | 10/2008 |
| JP | 2009-229065 A | 10/2009 |
| JP | 4370565 B2 | 11/2009 |
| JP | 2010-60421 A | 3/2010 |
| JP | 4443621 B2 | 3/2010 |
| JP | 4776570 B2 | 9/2011 |
| WO | 2008/108194 A2 | 9/2008 |
| WO | 2009/115899 A2 | 9/2009 |

OTHER PUBLICATIONS

German Office Action and English translation thereof, dated Apr. 24, 2015, for German Application No. 11 2012 006 602.2.

\* cited by examiner

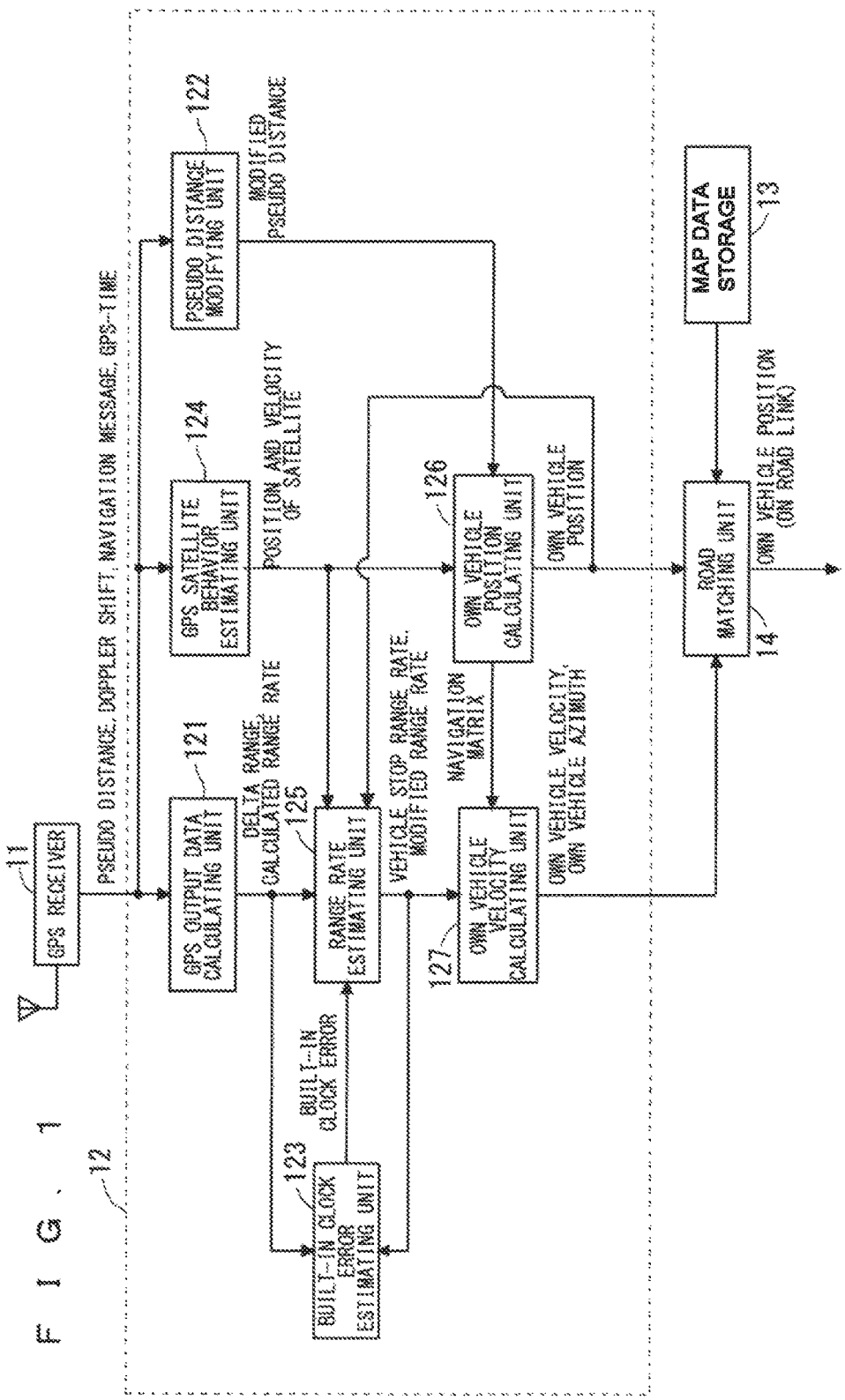

F I G. 3
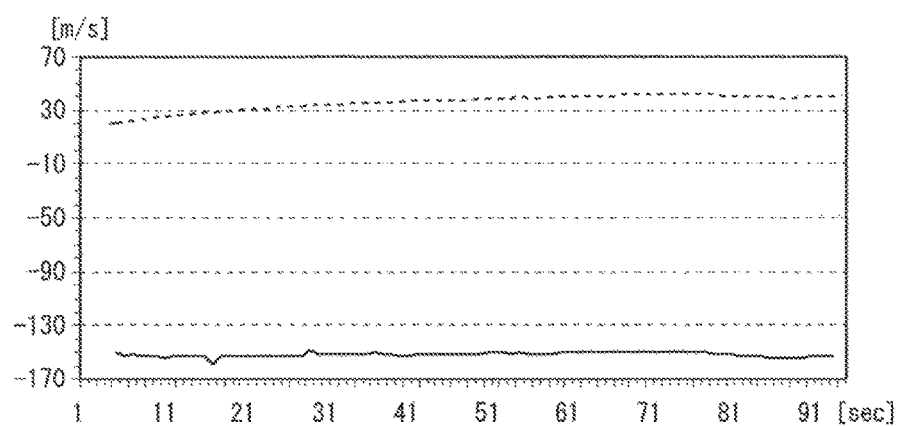
F I G. 4
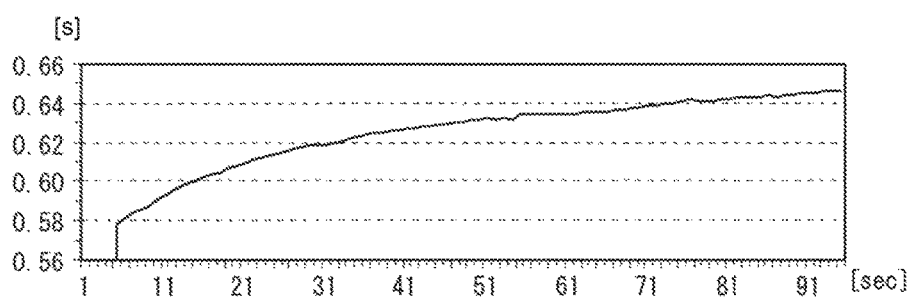

F I G. 5
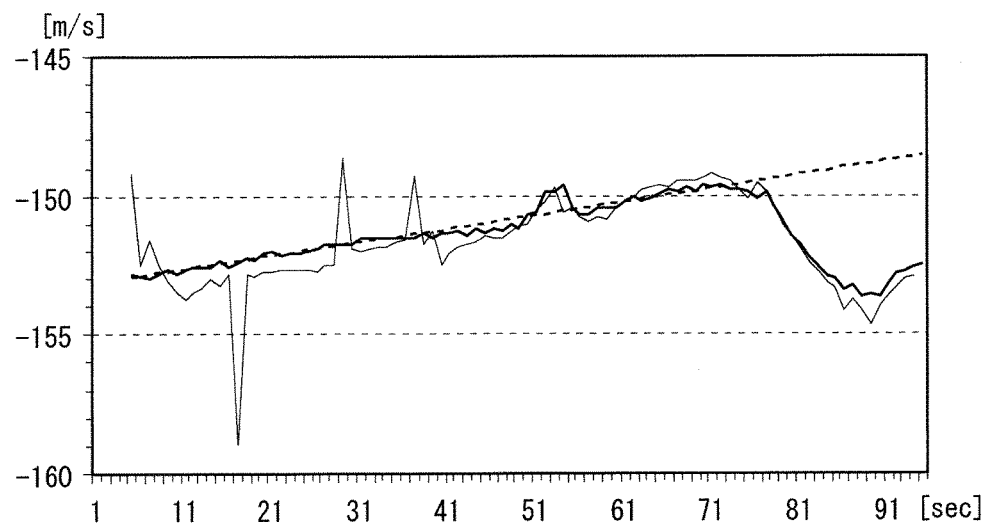
F I G. 6
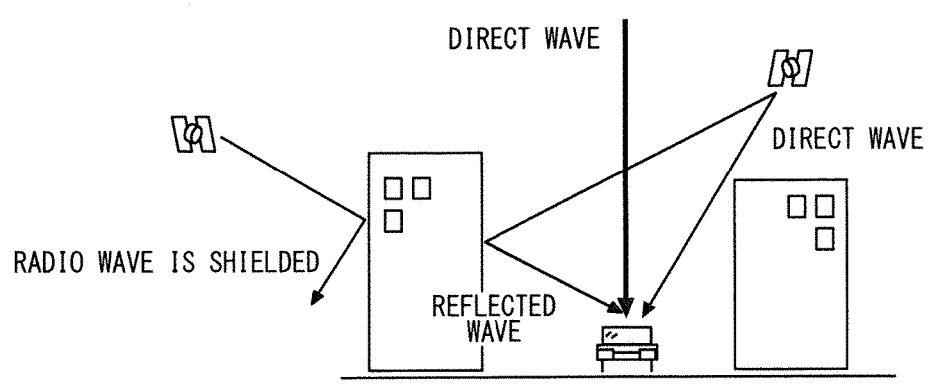

F I G . 7
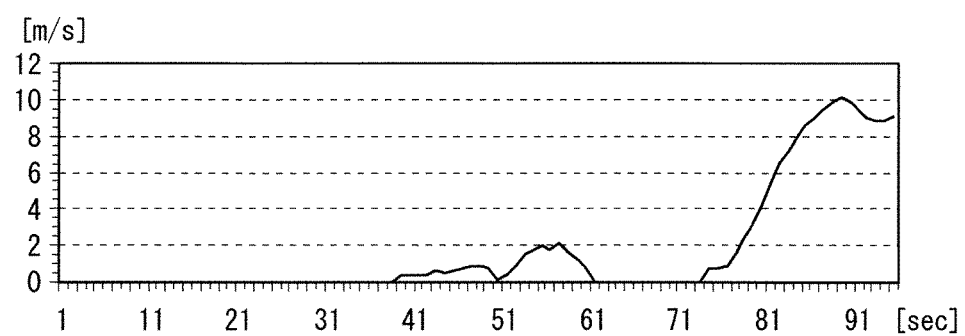

F I G . 1 8
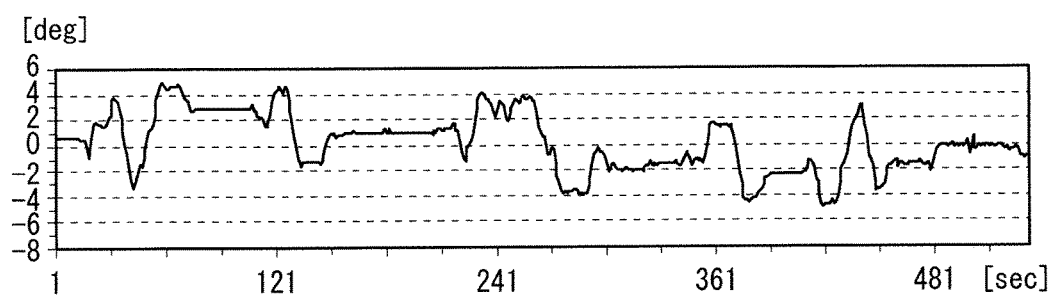

POSITIONING METHOD

TECHNICAL FIELD

The present invention relates to a positioning device of a moving body and, more particularly, relates to a positioning device which uses transmission signals from GPS (Global Positioning System) satellites.

BACKGROUND ART

Currently, navigation devices of moving bodies such as vehicles are known. This navigation device displays a vehicle position on a map displayed on a display device, and gives a guidance to a destination. When a vehicle position is displayed on a road on a map, a GPS positioning device which obtains GPS satellite positioning results and various sensors such as a velocity sensor, an angular velocity sensor and an acceleration sensor are used to observe and measure a vehicle motion and then processing called map matching is performed to identify the vehicle position on a road link of map data.

However, a scale factor for calculating a moving distance and a velocity based on output pulses of a velocity sensor differs per vehicle. Further, zero voltages of an angular velocity sensor and an acceleration sensor fluctuate (drift), and therefore various sensors need to be optionally corrected. To correct various sensors, positioning results transmitted from GPS satellites are generally used for a correction reference value or for correction conditions.

For example, Patent Document 1 discloses a technique of calculating a vehicle velocity in a horizontal direction (a direction on a horizontal plane perpendicular to a vertical direction) based on signals (positioning results) from GPS satellites, and correcting a scale factor based on the calculated vehicle velocity. Further, Patent Document 2 and Patent Document 3 disclose techniques of calculating a pitch angle (an angle formed between a traveling direction of a vehicle and the horizontal plane) based on signals from GPS satellites, and calculating an acceleration of the vehicle in a traveling direction, a gravitational acceleration and a fluctuation of a zero voltage of the acceleration sensor based on the calculated pitch angle.

PRIOR ART DOCUMENT

Patent Document

Patent Document 1: Japanese Patent No. 4370565
Patent Document 2: Japanese Patent No. 4776570
Patent Document 3: Japanese Patent Application Laid-Open No. 2003-307524

SUMMARY OF INVENTION

Problems to be Solved by the Invention

However, the above positioning device, i.e., a positioning device which measures a position of a vehicle based on positioning results from GPS satellites and measurement results from various sensors has the following problems.

(1) An output pulse of a velocity sensor is outputted according to rotations of tires on a road surface. Hence, there is a problem that, upon driving on a sloped road at which a two-dimensional vehicle velocity on a horizontal plane obtained as positioning results from GPS satellites and an actual three-dimensional vehicle velocity do not match, a distance (=pulse number×scale factor) longer than a road link length indicated by map data on the horizontal plane is measured.

(2) To calculate a vehicle velocity of a three-dimensional ENU coordinate system (an orthogonal system in which the east direction is defined as a x axis, the north direction is defined as a y axis, a vertical direction is defined as a z axis and a xy plane is defined as a horizontal plane) based on positioning results from GPS satellites, first, a range rate including the same unit ([m/s]) as a time change in pseudo distances is calculated from a change amount (Doppler shift) of a carrier frequency of a GPS satellite radio wave. In addition to the calculation, the range rate in case that a vehicle is stopping is estimated, and a vehicle velocity is calculated from a difference between both range rates. However, there is a problem that, upon low speed driving which makes smaller a difference between a calculated range rate and an estimated range rate, a vehicle velocity error becomes great.

(3) A positioning device performs positioning by assuming that times of built-in clocks of GPS satellites and a time of a built-in clock of a vehicle synchronize with a common time sequence (GPS-Time). Built-in clocks in both of the GPS satellites and the vehicle drift, and therefore it is necessary to optionally modify the respective clocks. Generally, expensive atomic clocks of little drifts are used for built-in clocks of the GPS satellites, and a low-cost crystal clock of a significant drift is used for a built-in clock of a vehicle. Drift correction parameters of atomic clocks are transmitted from GPS satellites to a vehicle, and the vehicle can modify a drift of the built-in clock of the vehicle by receiving signals from the GPS satellites. However, there is a problem that, even when modification is performed in this way, an error equal to or less than 1 μsec is left in the built-in clock of the vehicle, this built-in clock error is a measurement error of a range rate common to all GPS satellites which transmit signals to the vehicle, and deteriorates accuracy to measure, for example, a vehicle velocity.

The present invention has been made in light of the above problems. An object of the present invention is to provide in a positioning device of a moving body such as a vehicle a technique which can modify a built-in clock error of a moving body and increase accuracy of a velocity.

Means for Solving the Problems

A positioning device according to the present invention is a positioning device of a moving body includes: a calculating unit that calculates a time difference on a pseudo distance to GPS satellite as a delta range based on transmission signal from the GPS satellite, and calculates a first range rate based on a Doppler shift of the transmission signal; and a built-in clock error estimating unit that estimates an error of a built-in clock of the moving body as a built-in clock error based on a difference between the delta range and the first range rate. Further, the positioning device includes a range rate estimating unit that estimates a second range rate in case that the moving body stops, based on position and velocity of the GPS satellite based on the transmission signal and a position of the moving body, and modifies the first range rate calculated by the calculating unit, based on the built-in clock error. Furthermore, the positioning device includes a moving body velocity calculating unit that calculates a first velocity of the moving body related to three axial directions that form an orthogonal coordinate system, based on a navigation matrix, the second range rate estimated by the range rate estimating unit and the first range rate modified by the range rate estimating unit, said navigation matrix including the position of the GPS satellite based on the transmission signal and including the position of the moving body.

Effects of the Invention

The present invention calculates a built-in clock error based on a difference between a delta range and a first range rate, and modifies an error of the first range rate using the built-in clock error. Consequently, it is possible to reduce an error of the first velocity caused by the built-in clock error, and increase accuracy of the first velocity.

BRIEF DESCRIPTION OF DRAWINGS

FIG. 1 is a block diagram showing a configuration of a navigation device according to a first embodiment.
FIG. 3 is a view showing a delta range and a calculated range rate.
FIG. 4 is a view showing a built-in clock error.
FIG. 5 is a view showing a vehicle stop range rate, a modified range rate and a delta range.
FIG. 6 is a view showing multipaths.
FIG. 7 is a view showing an own vehicle velocity measured by a velocity sensor.
FIG. 18 is a view showing a measured pitch angle measured by a pitch angle measurement unit.

DESCRIPTION OF EMBODIMENTS

<First Embodiment>

Figure 2:
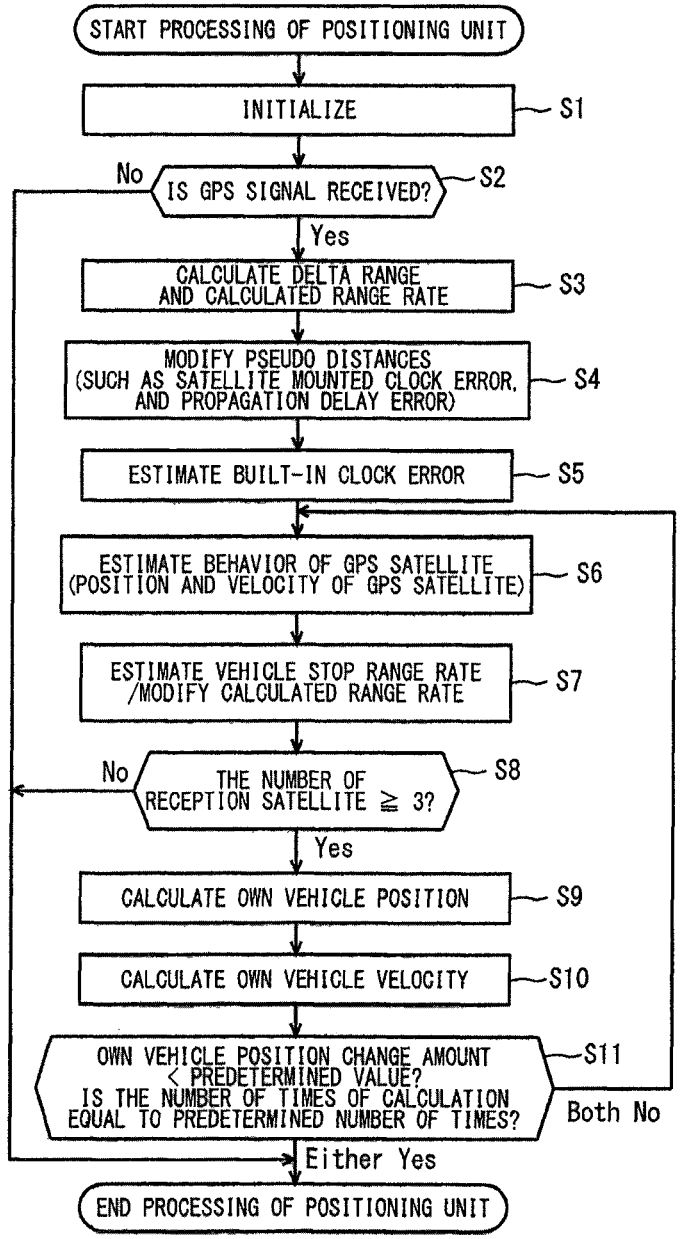
FIG. 2 is a flowchart showing an operation of the navigation device according to the first embodiment.

A navigation device having a positioning device of a moving body such as a vehicle will be described below. FIG. 1 is a block diagram showing a configuration required to measure a position of the vehicle (also referred to as an "own vehicle") in a configuration of the navigation device according to the first embodiment of the present invention.

The navigation device shown in FIG. 1 has a GPS receiver 11 which receives transmission signals from GPS satellites to obtain Raw data (data such as pseudo distances, Doppler shifts, navigation messages and GPS times required for positioning calculation) based on the transmission signals, and a positioning unit 12 which measures an own vehicle position (e.g. a position on a latitude and a longitude), an own vehicle velocity and an own vehicle azimuth based on the Raw data obtained by the GPS receiver 11.

Further, this navigation device has a map storage 13 which stores map data including data indicating linear shapes and road links represented by coordinate points, and a road matching unit 14 which reads a road link from the map data storage 13 based on the own vehicle position, the own vehicle velocity and the own vehicle azimuth measured by the positioning unit 12 to identify the own vehicle position on the road link.

Next, the GPS receiver 11 and the positioning unit 12 will be described in detail.

The GPS receiver 11 has a GPS antenna which receives transmission signals (radio waves) transmitted from a plurality of GPS satellites above the own vehicle. The GPS receiver 11 obtains Raw data based on a transmission signal received at the GPS antenna and outputted from each GPS satellite to output the Raw data to the positioning unit 12.

The positioning unit 12 has a GPS output data calculating unit 121, a pseudo distance modifying unit 122, a built-in clock error estimating unit 123, a GPS satellite behavior estimating unit 124, a range rate estimating unit 125, an own vehicle position calculating unit 126 and an own vehicle velocity calculating unit (moving body velocity calculating unit) 127.

Although described in detail below, the GPS output data calculating unit 121 calculates a time difference value of the pseudo distances as a delta range $\Delta\rho_{C\tau}(t_i)$ based on the pseudo distances $\rho_{C\tau}(t_i)$(substantially, the transmission signals from the GPS satellites) from the GPS receiver 11. In addition, $t_i$ indicates a time of positioning processing of the positioning unit 12 repeated at a processing cycle $\Delta T$, and a subscript i indicates a number which increases by one per processing cycle $\Delta T$.

Further, the GPS output data calculating unit 121 calculates a first range rate $\Delta\rho_{rate}(t_i)$ including the same unit ([m/s]) as a delta range $\Delta\rho_{C\tau}(t_i)$ based on a Doppler shift $f_{dop}(t_i)$ (substantially, a Doppler shift of a transmission signal from the GPS satellite) from the GPS receiver 11. The GPS output data calculating unit 121 calculates the delta range $\Delta\rho_{C\tau}(t_i)$ and the first range rate $\Delta\rho_{rate}(t_i)$ of each GPS satellite (also referred to as a "reception satellite") whose transmission signal is received by the GPS receiver 11.

In addition, a plurality of types of range rates appears in the following description. Therefore, the first range rate $\Delta\rho_{rate}(t_i)$ calculated by the GPS output data calculating unit 121 is referred to as a "calculated range rate $\Delta\rho_{rate}(t_i)$" for ease of convenience.

The pseudo distance modifying unit 122 calculates a satellite mounted clock error $dT_{sat}$, an ionospheric radio wave propagation delay error $d_{iono}$, and a tropospheric radio wave propagation delay error $d_{trop}$ included in the pseudo distance $\rho_{C\tau}(t_i)$ outputted from the GPS receiver 11 using the navigation message outputted from the GPS receiver 11, and calculates a pseudo distance (also referred to as a "modified pseudo distance $\rho_{C\tau}'(t_i)$") modified to exclude these errors.

The built-in clock error estimating unit 123 receives an input of the delta ranges $\Delta\rho_{C\tau}(t_i)$ and the calculated range rates $\Delta\rho_{rate}(t_i)$ of all reception satellites calculated by the GPS output data calculating unit 121. The built-in clock error estimating unit 123 estimates an error of a built-in clock provided in the own vehicle as a built-in clock error $\varepsilon_{tcar}(t_i)$ based on the difference (delta in this case) between the delta range $\Delta\rho_{C\tau}(t_i)$ and the calculated range rate $\Delta\rho_{rate}(t_i)$.

In addition, the built-in clock error estimating unit 123 can estimate one built-in clock error $\varepsilon_{tcar}(t_i)$ from the delta range $\Delta\rho_{C\tau}(t_i)$ and the calculated range rate $\Delta\rho_{rate}(t_i)$ of one reception satellite. However, when receiving an input of delta ranges $\Delta\rho_{C\tau}(t_i)$ and calculated range rates $\Delta\rho_{rate}(t_i)$ of a plurality of reception satellites, the built-in clock error estimating unit 123 estimates an average value of a plurality of built-in clock errors $\varepsilon_{tcar}(t_i)$ estimated from the delta ranges $\Delta\rho_{C\tau}(t_i)$ and the calculated range rates $\Delta\rho_{rate}(t_i)$, as one built-in clock error $\varepsilon_{tcar}(t_i)$.

The GPS satellite behavior estimating unit 124 estimates a position $P_s$ and a velocity $V_s$ of a GPS satellite in a GPS-Time based on the navigation message outputted from the GPS receiver 11. The GPS satellite behavior estimating unit 124 estimates the positions $P_s$ and the velocities $V_s$ of all reception satellites several times during conversion calculation per processing cycle of the positioning unit 12.

The range rate estimating unit 125 receives an input of the calculated range rates $\Delta\rho_{rate}(t_i)$ from the GPS output data calculating unit 121, the built-in clock errors $\varepsilon_{tcar}(t_i)$ from the built-in clock error estimating unit 123, the positions $P_s$ and the velocities $V_s$ of all reception satellites from the GPS satellite behavior estimating unit 124, and an own vehicle position $P_o$ (re-calculated GPS position) calculated by the own vehicle position calculating unit 126 described below.

The range rate estimating unit 125 estimates a second range rate $\Delta\rho_{rate-s}(t_i)$ in case that a vehicle is assumed to be stopping, based on the positions $P_s$, the velocities $V_s$ of all reception satellites and the own vehicle positions $P_o$. In addition, the second range rate $\Delta\rho_{rate-s}(t_i)$ estimated by the range rate estimating unit 125 in case that the vehicle is assumed to be stopping is referred to as a "vehicle stop range rate $\Delta\rho_{rate-s}(t_i)$" below.

Further, in addition to estimation of a vehicle stop range rate, the range rate estimating unit 125 modifies the calculated range rate $\Delta\rho_{rate}(t_i)$ calculated by the GPS output data calculating unit 121, based on the built-clock error $\varepsilon_{tcar}(t_i)$ estimated by the built-in clock error estimating unit 123.

The own vehicle position calculating unit 126 performs numerical value calculation based on the modified pseudo distances $\rho_{C\tau}'(t_i)$ from the pseudo distance modifying unit 122 and the positions $P_s$ and the velocities $V_s$ of all reception satellites from the GPS satellite behavior estimating unit 124 to calculate the own vehicle position $P_o$ and outputs the own vehicle position $P_o$ to the range rate estimating unit 125 and the road matching unit 14. Further, the own vehicle position calculating unit 126 generates a navigation matrix A including the positions $P_s$ of all reception satellites from the GPS satellite behavior estimating unit 124 and including the own vehicle position $P_o$ calculated by the GPS position calculating unit 126, and outputs the navigation matrix A to the own vehicle velocity calculating unit 127.

The own vehicle velocity calculating unit 127 calculates own vehicle velocities $V_o$ (first velocities $V_o$) related to three axial directions which form an ENU coordinate system (an orthogonal coordinate system in which the east direction is defined as a x axis, the north direction is defined as a y axis, the vertical direction is defined as a z axis and the xy plane is defined as a horizontal plane), i.e., re-calculated GPS velocities, based on the navigation matrix A from the own vehicle position calculating unit 126, the vehicle stop range rate $\Delta\rho_{rate-s}(t_i)$ estimated by the range rate estimating unit 125 and the calculated range rate $\Delta\rho_{rate}(t_i)$ modified by the range rate estimating unit 125. In addition, the own vehicle velocity calculating unit 127 can also calculate an own vehicle azimuth by calculating this own vehicle velocity $V_o$.

Next, an operation of the navigation device in FIG. 1 will be described with reference to the flowchart in FIG. 2 showing positioning processing performed by the positioning unit 12 per processing cycle.

First, in step S1 shown in FIG. 2, the navigation device initializes processing of the positioning unit 12.

In step S2, the positioning unit 12 determines whether or not the number of reception satellites is one or more, i.e., whether or not transmission signals transmitted from one or more GPS satellites are received. When it is determined that the transmission signals are received, the step moves to step S3, and, when it is determined that no transmission signal is received, current positioning processing is finished without performing any processing.

In step S3, the GPS output data calculating unit 121 calculates a time difference value between the pseudo distance of previous positioning processing and the pseudo distance of current positioning processing as a delta range $\Delta\rho_{C\tau}(t_i)$ by applying to following equation (1) the pseudo distance $\rho_{C\tau}(t_{i-1})$ of previous positioning processing and the pseudo distance $\rho_{C\tau}(t_i)$ of the current positioning processing outputted from the GPS receiver 11.

[Mathematical 1]

$$\Delta\rho_{C\tau}(t_i)=(\rho_{C\tau}(t_i)-\rho_{C\tau}(t_{i-1}))\Delta t \qquad (1)$$

Where,
$\Delta\rho_{C\tau}(t_i)$: Delta range [m/s]
$\rho_{C\tau}(t_i)$: Pseudo distance outputted from GPS receiver in current positioning processing [m]
$\rho_{C\tau}(t_{i-1})$: Pseudo distance outputted from UPS receiver in previous positioning processing [m]
$\Delta t$: Processing cycle [s]

Further, in same step S3, the GPS output data calculating unit 121 calculates the calculated range rate $\Delta\rho_{rate}(t_i)$ by applying to following equation (2) the Doppler shift $f_{dop}(t_i)$ outputted from the GPS receiver 11.

[Mathematical 2]

$$\Delta\rho_{rate}(t_i)=f_{dop}(t_i)\cdot C/f_{L1} \qquad (2)$$

Where,
$\Delta\rho_{rate}(t_i)$: Calculated range rate [m/s]
$f_{L1}$: Carrier frequency of satellite radio wave [Hz]
C: Velocity of light [m/s]

In step S4, the pseudo distance modifying unit 122 calculates the satellite mounted clock error $dT_{sat}$ and the ionospheric radio wave propagation delay error $d_{iono}$ included in the pseudo distance $\rho_{C\tau}(t_i)$ based on the navigation message outputted from the GPS receiver 11, and calculates the tropospheric radio wave propagation delay error $d_{trop}$ included in the pseudo distance $\rho_{C\tau}(t_i)$ based on an error model. Further, the pseudo distance modifying unit 122 calculates a modified pseudo distance $\rho_{C\tau}'(t_i)$ by modifying the pseudo distance $\rho_{C\tau}(t_i)$ by applying to following equation (3) the pseudo distance $\rho_{C\tau}(t_i)$ and these errors.

[Mathematical 3]

$$\rho_{C\tau}'(t_i)=\rho_{C\tau}(t_i)+dT_{sat}-d_{iono}-d_{trop} \qquad (3)$$

Where,
$\rho_{C\tau}'(t_i)$: Modified pseudo distance [m]
$dT_{sat}$: Satellite mounted clock error [m]
$d_{iono}$: Ionospheric radio wave propagation delay error [m]
$d_{trop}$: Tropospheric radio wave propagation delay error [m]

In step S5, the built-in clock error estimating unit 123 applies the delta ranges $\Delta\rho_{C\tau}(t_i)$ and the calculated range rates $\Delta\rho_{rate}(t_i)$ of all reception satellites obtained in step S3, to following equation (4) including these deltas to estimate a built-in clock errors $\varepsilon_{tcar}(t_i)$ When the number of all reception satellites is plural, i.e., a plurality of built-in clock errors $\varepsilon_{tcar}(t_i)$ can be obtained, the average value of the built-in clock errors is one built-in clock error $\varepsilon_{tcar}(t_i)$.

[Mathematical 4]

$$\varepsilon_{tcar}(t_i)=(\Delta\rho_{rate}(t_i)-\Delta\rho_{C\tau}(t_i))\cdot\Delta t/C \quad (4)$$

Where, $\varepsilon_{tcar}(t_i)$: Built-in clock error [s]
$\Delta\rho_{rate}(t_i)$: Calculated range rate [m/s]
$\Delta\rho_{C\tau}(t_i)$: Delta range [m/s]
$\Delta t$: Processing cycle [s]
C: Velocity of light [m/s]

FIG. 3 is a view showing an actual calculation result of the delta range $\Delta\rho_{C\tau}(t_i)$ and the calculated range rate $\Delta\rho_{rate}(t_i)$ FIG. 3 shows the delta range $\Delta\rho_{C\tau}(t_i)$ as a solid line and the calculated range rate $\Delta\rho_{rate}(t_i)$ as a broken line.

FIG. 4 shows a view showing the built-in clock error $\varepsilon_{tcar}(t_i)$ obtained by applying the calculation result shown in FIG. 3 to equation (4). As shown in this FIG. 4, the built-in clock error $\varepsilon_{tcar}(t_i)$, i.e., a drift of the built-in clock cannot be expressed in a linear format, and therefore the frequency to estimate the built-in clock error $\varepsilon_{tcar}(t_i)$ is preferably high.

Back to FIG. 2, after step S5, the positioning unit 12 performs convergence calculation on the own vehicle position $P_o$ based on the Raw data (i.e., the transmission signals from the GPS satellites) by performing loop processing in step S6 to step S11 in one positioning processing. When, for example, a difference between the own vehicle position $P_o$ obtained by previous loop processing and the own vehicle position $P_o$ obtained by current loop processing is equal to or less than a predetermined value, the positioning unit 12 finishes the loop processing. The own vehicle position obtained in this case is output as an own vehicle position obtained by current positioning processing.

Next, an operation of each step from step S6 to step S11 will be described in detail.

First, in step S6, the GPS satellite behavior estimating unit 124 estimates the positions $P_s$ ($x_s$, $y_s$, $z_s$) and the velocities $V_s$ ($V_{sx}$, $V_{sy}$, $V_{sz}$) of all reception satellites in the GPS-Time using an ephemeris which is included in the navigation message from the GPS receiver 11 and indicates positions of the GPS satellites on a trajectory. After the GPS-Time is initialized by the GPS-time from the GPS receiver 11, a value of the GPS-Time changes during convergence calculation, and, following this change, the positions $P_s$ and the velocities $V_s$ of the GPS satellites on a satellite trajectory also change.

In step S7, the range rate estimating unit 125 estimates the vehicle stop range rate $\Delta\rho_{rate-s}(t_i)$ by applying to following equation (5) the positions $P_s$ ($x_s$, $y_s$, $z_s$) and the velocities $V_s$ ($v_{sx}$, $v_{sy}$, $v_{sz}$) of all reception satellites estimated by the GPS satellite behavior estimating unit 124 and the own vehicle position $P_o$ ($x_o$, $y_o$, $z_o$) estimated by the own vehicle position calculating unit 126. In addition, for the own vehicle position $P_o$, the own vehicle position $P_o$ calculated in step S9 in previous loop processing or previous positioning processing is used.

[Mathematical 5]

$$\Delta\rho_{rate-s}(t_i)=LOS_x\cdot v_{sx}+LOS_y\cdot v_{sy}+LOS_z\cdot v_{sz} \quad (5)$$

Meanwhile, $LOS_x=(x_o-x_s)/\|P_s-P_o\|$ $LOS_y=(y_o-y_s)/\|P_s-P_o\|$ $LOS_z=(z_o-z_s)/\|P_s-P_o\|$ $\|P_s-P_o\|=\sqrt{(x_s-x_o)^2+(y_s-y_o)^2+(z_s-z_o)^2}$ Where, $\Delta\rho_{rate-s}(t_i)$: Vehicle stop range rate [m/s]
$P_s$: Positions ($x_s$, $y_s$, $z_s$) of GPS satellite calculated from navigation message [m]
$V_s$: Velocities ($v_{sx}$, $v_{sy}$, $v_{sz}$) of GPS satellite calculated from navigation message [m/s]
$P_o$: Own vehicle position ($x_0$, $y_0$, $z_0$) [m]
$\|P_s-P_o\|$: Distance between GPS satellite position and own vehicle position [m]
LOS: Line of site vector viewing GPS satellite from own vehicle Further, in addition to estimation of the vehicle stop range rate, the range rate estimating unit 125 applies to following equation (6) the calculated range rate $\Delta\rho_{rate}(t_i)$ calculated in step S3 by the GPS output data calculating unit 121 and the built-clock error $\varepsilon_{tcar}(t_i)$ estimated in step S5 by the built-in clock error estimating unit 123. That is, the range rate estimating unit 125 modifies the calculated range rate $\Delta\rho_{rate}(t_i)$ based on the built-in clock error $\varepsilon_{tcar}(t_i)$. In addition, the calculated range rate modified by the range rate estimating unit 125 is also referred to as the "modified range rate $\Delta\rho_{rate}'(t_i)$" below.

[Mathematical 6]

$$\Delta\rho_{rate}'(t_i)=\Delta\rho_{rate}(t_i)-\varepsilon t_{car}(t_i)/\Delta t\cdot C \quad (6)$$

Where, $\Delta\rho_{rate}'(t_i)$: Modified range rate [m/s]
$\Delta\rho_{rate}(t_i)$: Calculated range rate [m/s]
$\varepsilon_{tcar}(t_i)$: Built-in clock error [s]
$\Delta t$: Processing cycle [s]
C: Velocity of light [m/s]

In this regard, to make it easier to understand a relationship among the vehicle stop range rate $\Delta\rho_{rate-s}(t_i)$ obtained from equation (5), the modified range rate $\Delta\rho_{rate}'(t_i)$ obtained from equation (6) and the delta range $\Delta\rho_{C\tau}(t_i)$ obtained by equation (1), FIG. 5 illustrates time transitions of the vehicle stop range rate, the modified range rate and the delta range obtained from the data shown in FIG. 3. In addition, in FIG. 5, the vehicle stop range rate $\Delta\rho_{rate-s}(t_i)$ is indicated by a broken line, the modified range rate $\Delta\rho_{rate}'(t_i)$ is indicated by a bold solid line and the delta range $\Delta\rho_{C\tau}(t_i)$ is indicated by a thin solid line.

FIG. 6 shows a view showing multipaths including paths of a satellite radio wave (reflected wave) reflected by an architecture or the like, and a satellite radio wave (direct wave) which is not reflected. An abrupt change appearing in the delta range $\Delta\rho_{C\tau}(t_i)$ indicated by the thin solid line in FIG. 5 indicates a multipath influence. In addition, FIG. 5 illustrates a data result obtained when the own vehicle drives out of a parking lot around which there are a small number of buildings. Even in this case, a little multipath influence temporarily occurs in the delta range $\Delta\rho_{C\tau}(t_i)$.

Meanwhile, as shown in FIG. 5, the modified range rate $\Delta\rho_{rate}'(t_i)$ obtained by above equation (6) includes the suppressed multipath influence (abrupt change) unlike the delta range $\Delta\rho_{C\tau}(t_i)$, and substantially matches with the delta range $\Delta\rho_{C\tau}(t_i)$ except the influence. Further, this modified range rate $\Delta\rho_{rate}'(t_i)$ substantially matches with the vehicle stop range rate $\Delta\rho_{rate-s}(t_i)$ upon vehicle stop.

Next, FIG. 7 shows an own vehicle velocity measured by a velocity sensor under the same situation as that in FIG. 5. A difference between the modified range rate $\Delta\rho_{rate}'(t_i)$ and the vehicle stop range rate $\Delta\rho_{rate-s}(t_i)$ shown in FIG. 5 relates to the own vehicle velocity measured by the velocity sensor shown in FIG. 7. Thus, it is possible to calculate the own vehicle velocity by calculating the difference between the modified range rate $\Delta\rho_{rate}'(t_i)$ and the vehicle stop range rate $\Delta\rho_{rate-s}(t_i)$. Consequently, modifying the calculated range rate $\Delta\rho_{rate}(t_i)$ based on the built-in clock error $\varepsilon_{tcar}(t_i)$, i.e., calculating the modified range rate $\Delta\rho_{rate}'(t_i)$ is important.

Back to FIG. 2, in step S8, the positioning unit 12 checks whether or not the number of GPS satellites for which positioning calculation can be performed, i.e., the number of all reception satellites is three or more. When the number of all reception satellites is three or more, the step moves to next step S9. When the number of all reception satellites is less than three, current positioning processing is finished.

In step S9, the own vehicle position calculating unit 126 calculates the own vehicle position $P_o$ of current loop processing by applying to a right side of following equation (7) the modified pseudo distances $\rho_{c\tau}'(t_i)$ calculated in step S4, the positions $P_s$ and the velocities $V_s$ of all reception satellites estimated in step S6, and the own vehicle position $P_o$ calculated in previous loop processing or previous positioning processing by the own vehicle position calculating unit 126. In this case, the own vehicle position calculating unit 126 generates the navigation matrix A including the positions $P_s$ of all reception satellites estimated in step S6, and the own vehicle position $P_o$ calculated by the own vehicle position calculating unit 126.

[Mathematical 7]

$$Po = Po + \delta Po \qquad (7)$$

Meanwhile, $$\delta Po = (A^T W A)^{-1}(A^T W) \times \begin{vmatrix} \rho_{c\tau'1} - R_1 \\ \rho_{c\tau'2} - R_2 \\ \vdots \\ \rho_{c\tau'n} - R_n \end{vmatrix}$$

$$R = \sqrt{(x_s - x_o)^2 + (y_s - y_o)^2 + (z_s - z_o)^2}$$

$$W = \begin{vmatrix} 1/(\sigma_{\delta\rho1})^2 & 0 & 0 & 0 \\ 0 & 1/(\sigma_{\delta\rho2})^2 & 0 & 0 \\ \vdots & \vdots & \vdots & \vdots \\ 0 & 0 & 0 & 1/(\sigma_{\delta\rho n})^2 \end{vmatrix}$$

$$A = \begin{vmatrix} LOS_{1x} & LOS_{1y} & LOS_{1z} & 1 \\ LOS_{2x} & LOS_{2y} & LOS_{2z} & 1 \\ \vdots & \vdots & \vdots & \vdots \\ LOS_{nx} & LOS_{ny} & LOS_{nz} & 1 \end{vmatrix}$$

Wherein,
$P_o$: Own vehicle position $(x_0, y_0, z_0)$ [m]
$\delta P_o$: Change amount of own vehicle position $(\delta x_0, \delta y_0, \delta z_0)$ [m]
A: Navigation matrix
W: Weighted matrix
n: Number of all reception satellites
$\sigma_{\delta\rho}$: Standard deviation related to pseudo distance error [m]

In addition, a standard deviation $\sigma_{\delta\rho}$ of the pseudo distance errors in equation (7) is included per reception satellite and therefore, is calculated from a history of each processing cycle. Further, description of "$(t_i)$" is omitted in equation (7) for ease of description.

In step S10, the own vehicle velocity calculating unit 127 calculates the own vehicle velocities $V_o$ $(v_{ox}, v_{oy}, v_{oz})$ related to the three axial directions which form the ENU coordinate system by applying to following equation (8) the navigation matrix A from the own vehicle position calculating unit 126, the vehicle stop range rate $\Delta\rho_{rate-s}(t_i)$ estimated by the range rate estimating unit 125 and the modified range rate $\Delta\rho_{rate}'(t_i)$. The difference between the vehicle stop range rate $\Delta\rho_{rate-s}(t_i)$ and the modified range rate $\Delta\rho_{rate}'(t_i)$ included in this equation (8) corresponds to an own vehicle velocity as described above with reference to FIGS. 5 and 7. Further, similar to equation (7), description of "$(t_i)$" is omitted in equation (8) for ease of description.

[Mathematical 8]

$$V_o = (A^T W A)^{-1}(A^T W) \times \begin{vmatrix} \Delta\rho_{rate'1} - \Delta\rho_{rate-s1} \\ \Delta\rho_{rate'2} - \Delta\rho_{rate-s2} \\ \vdots \\ \Delta\rho_{rate'n} - \Delta\rho_{rate-sn} \end{vmatrix} \qquad (8)$$

Wherein,
$V_o$: Own vehicle velocity $(v_{ox}, v_{oy}, v_{oz})$ [m/s]

In step S11, the positioning unit 12 determines whether or not the own vehicle position $P_o$ converges in current positioning processing. More specifically, when a change amount $\delta P_o$ of the own vehicle position $P_o$ in above equation (7) is less than a predetermined value, it is determined that the own vehicle position $P_o$ converges, and the processing of the positioning unit 12 normally ends.

Meanwhile, when the change amount $\delta P_o$ is equal to or larger than the predetermined value and the number of times of calculation of the own vehicle position $P_o$ is less than a predetermined number of times, it is determined that the own vehicle position $P_o$ does not converge, the step returns to step S6 and convergence calculation is performed again.

Further, when the change amount $\delta P_o$ is equal to or larger than the predetermined value and the number of times of calculation of the own vehicle position $P_o$ is the predetermined number of times, it is determined that the own vehicle position cannot converge and processing of the positioning unit 12 abnormally ends. In addition, the positioning unit 12 may adopt the own vehicle position, the own vehicle velocity and the own vehicle azimuth calculated by the GPS receiver 11 as positioning results of the positioning unit 12.

The above navigation device according to the first embodiment calculates the built-in clock error $\varepsilon_{tcar}(t_i)$ based on the delta range $\Delta\rho_{c\tau}(t_i)$ calculated as a time difference between pseudo distances which are susceptible to a multipath influence, and the calculated range rate $\Delta\rho_{rate}(t_i)$ calculated from a Doppler shift which is hardly influenced by a multipath, and modifies an offset error of the calculated range rate $\Delta\rho_{rate}(t_i)$ using the built-in clock error. Consequently, it is possible to reduce an error of the own vehicle velocity $V_o$ caused by the built-in clock error $\varepsilon_{tcar}(t_i)$, and increase accuracy of the own vehicle velocity $V_o$ (e.g. the own vehicle velocity $V_o$ upon low speed driving). Further, it is also possible to increase accuracy of an own vehicle azimuth following an increase in the accuracy of the own vehicle velocity $V_o$.

Further, in the first embodiment, when the number of reception satellites is one or more, it is possible to estimate the built-in clock error $\varepsilon_{tcar}(t_i)$ Consequently, it is possible to monitor a change situation of the built-in clock error $\varepsilon_{tcar}(t_i)$ which influences positioning accuracy, for a long time. In addition, a case has been described with the first embodiment where an own vehicle position and an own vehicle velocity are calculated using the weighted least-squares method. However, an own vehicle position and an own vehicle velocity may be calculated using sequential computation or a Kalman filter.

<Second Embodiment>

Figure 8:
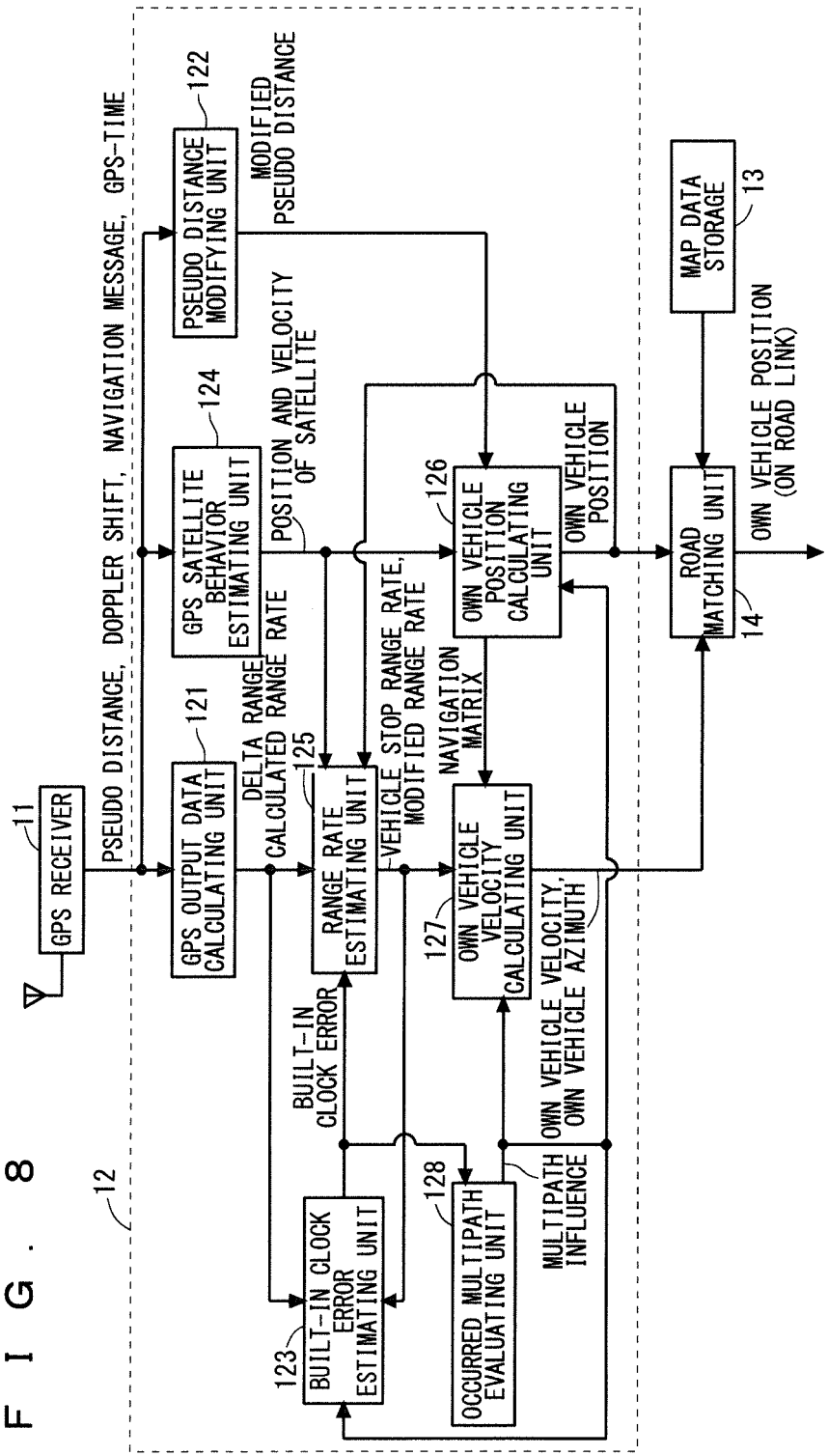
FIG. 8 is a block diagram showing a configuration of a navigation device according to a second embodiment.

FIG. 8 is a block diagram showing a configuration required to measure an own vehicle position in a configuration of a navigation device according to a second embodiment of the present invention. The second embodiment is expanded from the first embodiment, and therefore the same portions as those in the first embodiment will not be described and differences will be mainly described.

The navigation device shown in FIG. 8 employs a configuration where an occurred multipath evaluating unit 128 is added in a positioning unit 12 of the navigation device shown in FIG. 1. This occurred multipath evaluating unit 128 determines that there is a multipath influence when a change in a built-in clock error $\varepsilon_{tcar}(t_i)$ estimated by a built-in clock error estimating unit 123 is greater than a predetermined value. The occurred multipath evaluating unit 128 determines that there is no multipath influence when the change in the built-in clock error $\varepsilon_{tcar}(t_i)$ is equal to or less than the predetermined value. The occurred multipath evaluating unit 128 performs this determination on each reception satellite.

Figure 9:
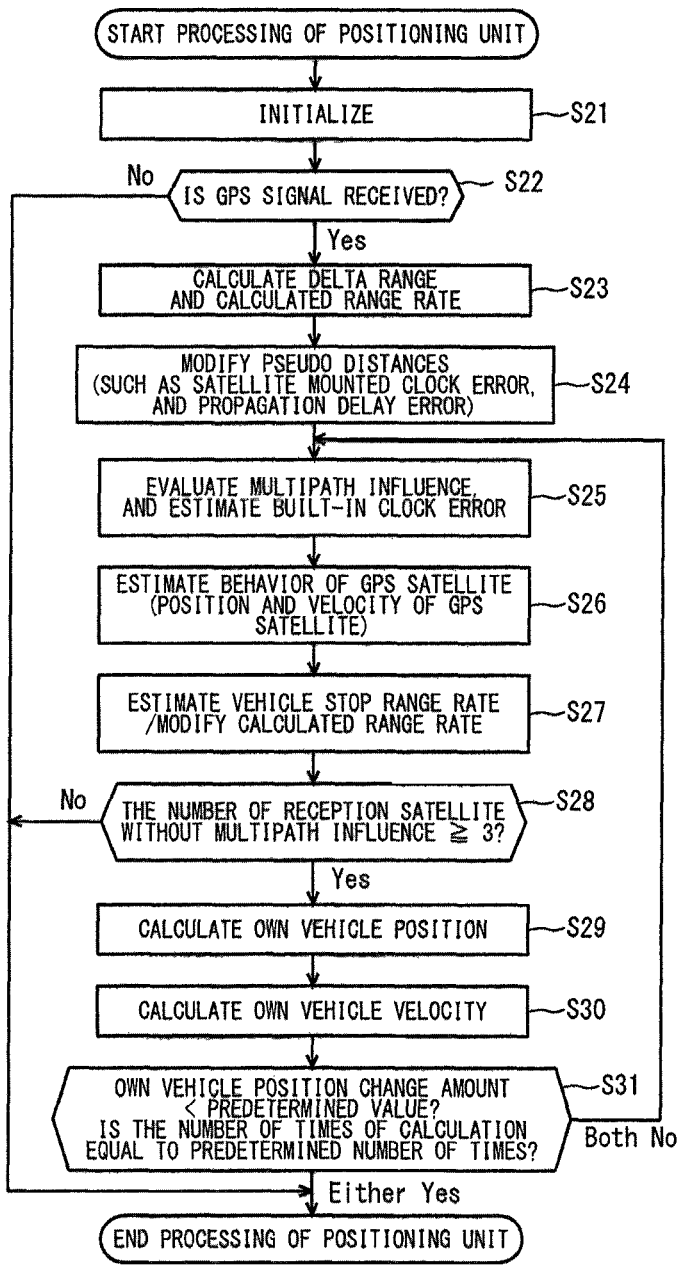
FIG. 9 is a flowchart showing an operation of the navigation device according to the second embodiment.

Next, an operation of the navigation device in FIG. 8 will be described with reference to the flowchart in FIG. 9 showing positioning processing performed by the positioning unit 12 per processing cycle. In addition, in the following description of the operation, the same portions as those in the first embodiment will not be described in detail and differences will be described.

First, the same operations as those in above step S1 to step S4 (see FIG. 2) are performed in step S21 to step S24. Further, after step S24, the positioning unit 12 performs convergence calculation on the own vehicle position $P_o$ based on the Raw data by performing loop processing in step S25 to step S31 in one positioning processing similar to the first embodiment. Next, an operation of each step of this loop processing will be described.

In step S25, the built-in clock error estimating unit 123 applies the delta ranges $\Delta\rho_{Cr}(t_i)$ and the calculated range rates $\Delta\rho_{rate}(t_i)$ of all reception satellites, to above equation (4), and calculates a built-in clock error $\varepsilon_{tcar}(t_i)$ per reception satellite.

Further, in same step S25, the occurred multipath evaluating unit 128 creates per reception satellite a history of the built-in clock error $\varepsilon_{tcar}(t_i)$ calculated by the built-in clock error estimating unit 123, and determines per reception satellite whether or not the change in the built-in clock error $\varepsilon_{tcar}(t_i)$ (a standard deviation or a difference between previous positioning processing and current positioning processing) is greater than a predetermined value. Further, the occurred multipath evaluating unit 128 determines that there is a multipath influence on a reception satellite on which the determination is performed when this change (the standard deviation or the difference) is greater than the predetermined value. The occurred multipath evaluating unit 128 determines that there is no multipath influence on a reception satellite on which the determination is performed when the change is equal to or less than the predetermined value.

Further, in same step S25, the built-in clock error estimating unit 123 excludes the built-in clock error $\varepsilon_{tcar}(t_i)$ which is determined by the occurred multipath evaluating unit 128 to be influenced by a multipath among the built-in clock errors $\varepsilon_{tcar}(t_i)$ of all reception satellites, and estimates an average value of the built-in clock errors $\varepsilon_{tcar}(t_i)$ of the rest of reception satellites as the built-in clock error $\varepsilon_{tcar}(t_i)$ used by a range rate estimating unit 125.

In step S26, a GPS satellite behavior estimating unit 124 performs the same processing as that in above step S6 on a reception satellite which is determined by the occurred multipath evaluating unit 128 not to be influenced by a multipath. In step S27, the range rate estimating unit 125 performs the same processing as that in above step S7 on a reception satellite which is determined by the occurred multipath evaluating unit 128 not to be influenced by a multipath.

In step S28, the positioning unit 12 checks whether or not the number of reception satellites which are determined by the occurred multipath evaluating unit 128 not to be influenced by a multipath is three or more. When the number of the reception satellites is three or more, the step moves to next step S29. When the number of the reception satellites is less than three, current positioning processing is finished.

In step S29, an own vehicle position calculating unit 126 performs the same processing as that in above step S9 on a reception satellite which is determined by the occurred multipath evaluating unit 128 not to be influenced by a multipath. In step S30, an own vehicle velocity calculating unit 127 performs the same processing as that in above step S10 on a reception satellite which is determined by the occurred multipath evaluating unit 128 not to be influenced by a multipath.

In step S31, the positioning unit 12 determines whether or not the own vehicle position $P_o$ converges in current positioning processing similar to above step S11. More specifically, when a change amount $\delta P_o$ of the own vehicle position $P_o$ in above equation (7) is less than a predetermined value, it is determined that the own vehicle position $P_o$ converges, and the processing of the positioning unit 12 normally ends.

Meanwhile, when the change amount $\delta P_o$ is equal to or larger than the predetermined value and the number of times of calculation of the own vehicle position $P_o$ is less than a predetermined number of times, it is determined that the own vehicle position $P_o$ does not converge, the step returns to step S25 and convergence calculation is performed again. When the change amount $\delta P_o$ is equal to or larger than the predetermined value and the number of times of calculation of the own vehicle position $P_o$ is the predetermined number of times, it is determined that the own vehicle position cannot converge and processing of the positioning unit 12 abnormally ends. In addition, the positioning unit 12 may adopt the own vehicle position, the own vehicle velocity and the own vehicle azimuth calculated by the GPS receiver 11 as positioning results of the positioning unit 12.

The above navigation device according to the second embodiment estimates a built-in clock error used by the range rate estimating unit 125 by excluding built-in clock errors which are determined to be larger than a predetermined value among the built-in clock errors $\varepsilon_{tcar}(t_i)$ of a plurality of reception satellites, and averaging a plurality of built-in clock errors obtained thereby. Consequently, even when some reception satellites are influenced by a multipath, it is possible to accurately calculate the built-in clock errors $\varepsilon_{tcar}(t_i)$, and, as a result, reliably increase accuracy of the own vehicle velocity $V_o$. Further, it is also possible to realize a configuration of determining reliability of the own vehicle velocity $V_o$ based on a rate of reception satellites which are influenced by a multipath.

In addition, the built-in clock error estimating unit 123 excludes the built-in clock errors $\varepsilon_{tcar}(t_i)$ of reception satellites which are determined to be influenced by a multipath among the built-in clock errors $\varepsilon_{tcar}(t_i)$ of a plurality of reception satellites, and estimates a built-in clock error used by the range rate estimating unit 125. However, the built-in clock error estimating unit 123 is not limited to this, and may evaluate a multipath influence at a plurality of stages and perform the above exclusion based on stepwise evaluation results. Alternatively, instead of performing the exclusion, the built-in clock error estimating unit 123 may estimate a built-in clock error used by the range rate estimating unit 125 by lowering weights of built-in clock errors which are determined to be larger than a predetermined value among the built-in clock errors $\varepsilon_{tcar}(t_i)$ of a plurality of reception satellites, and averaging the built-in clock errors obtained thereby.

Further, a built-in clock error used by the range rate estimating unit 125 is estimated from the built-in clock errors $\varepsilon_{tcar}(t_i)$ of a plurality of reception satellites as described above. However, estimating a built-in clock is not limited to this, and a built-in clock error used by the range rate estimating unit 125 may be estimated from the built-in clock error $\varepsilon_{tcar}(t_i)$ of one reception satellite.

That is, the built-in clock error estimating unit 123 may estimate a built-in clock error used by the range rate estimating unit 125 by excluding the built-in clock errors $\varepsilon_{tcar}(t_i)$ which are determined by the occurred multipath evaluating unit 128 to be larger than a predetermined value or lowering weights of the built-in clock errors $\varepsilon_{tcar}(t_i)$, for one reception satellite. When this configuration is employed, it is possible to monitor the built-in clock error $\varepsilon_{tcar}(t_i)$ from one reception satellite, and, consequently, monitor a drift situation of a built-in clock for a long time and determine reliability related to a positioning result such as the own vehicle velocity $V_o$ early when positioning is resumed.

In addition, when the built-in clock error $\varepsilon_{tcar}(t_i)$ which needs to be averaged as described above have all been excluded as a result of excluding the built-in clock errors $\varepsilon_{tcar}(t_i)$ in the above-described navigation device, the processing of the positioning unit 12 shown in FIG. 9 may be finished.

<Third Embodiment>

Figure 10:
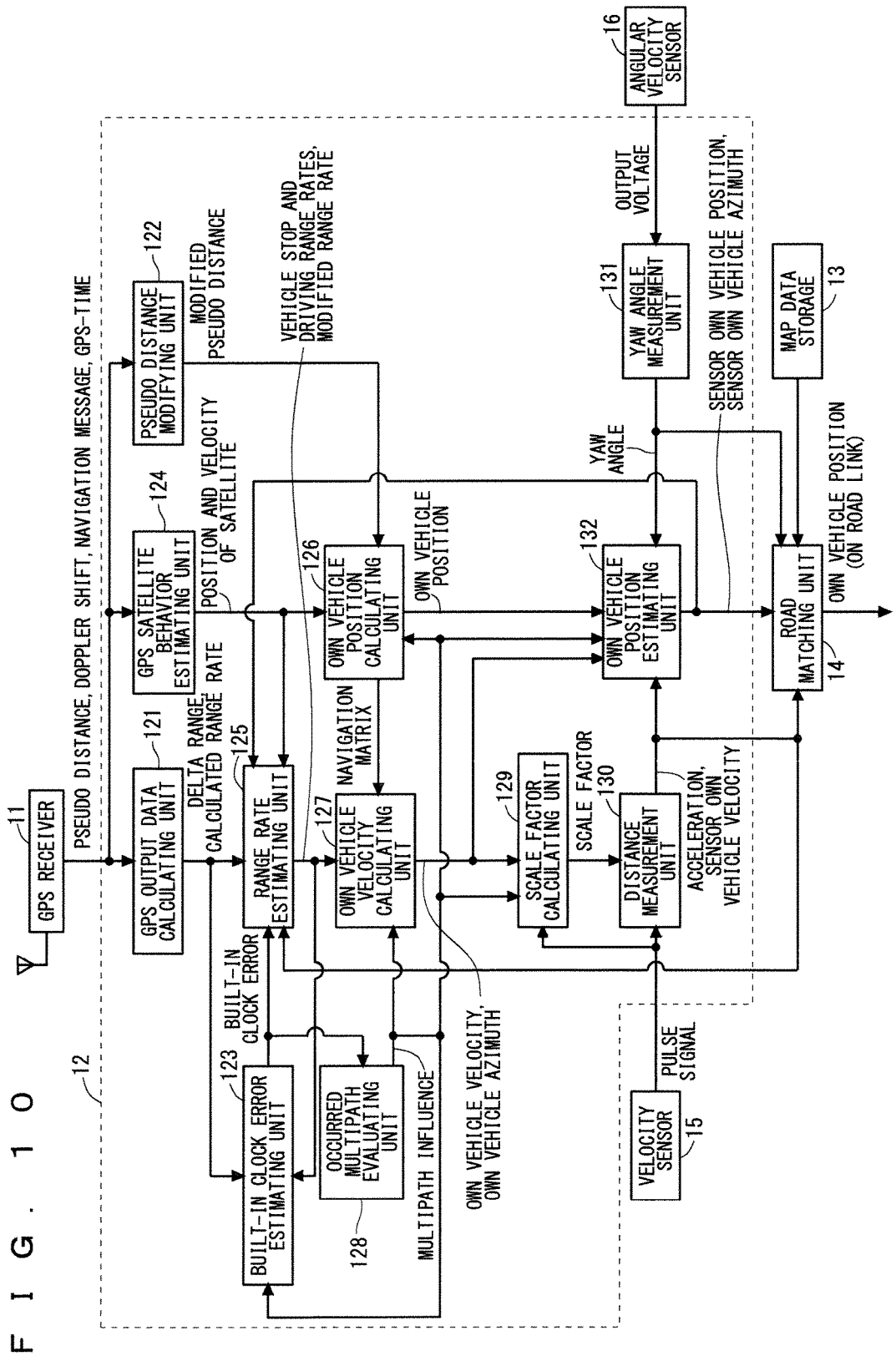
FIG. 10 is a block diagram showing a configuration of a navigation device according to a third embodiment.

FIG. 10 is a block diagram showing a configuration required to measure an own vehicle position in a configuration of a navigation device according to a third embodiment of the present invention. The third embodiment is expanded from the second embodiment, and therefore the same portions as those in the second embodiment will not be described and differences will be mainly described.

The navigation device shown in FIG. 10 employs a configuration where a velocity sensor 15 and an angular sensor 16 are added outside a positioning unit 12 of the navigation device shown in FIG. 8, and a scale factor calculating unit 129, a distance measurement unit 130, a yaw angle measurement unit 131 and an own vehicle position estimating unit 132 are added inside the positioning unit 12.

The velocity sensor 15 outputs a pulse signal corresponding to a moving distance of the vehicle. The scale factor calculating unit 129 calculates a scale factor based on own vehicle velocities $V_o$ ($v_{ox}$, $v_{oy}$, $v_{oz}$) calculated by the own vehicle velocity calculating unit 127 and the pulse signal outputted from the velocity sensor 15. The distance measurement unit 130 measures a moving distance, a velocity (second velocity) and an acceleration (first acceleration) along a traveling direction of a vehicle based on a pulse number of the pulse signal measured per predetermined timing and outputted from the velocity sensor 15 and the scale factor from the scale factor calculating unit 129.

In addition, the own vehicle velocity $V_o$ calculated by the above own vehicle velocity calculating unit 127 and the own vehicle velocity measured by the distance measurement unit 130 are equal in terms of that calculation targets (measurement targets) are the own vehicle velocities. However, the former is referred to as the own vehicle velocity $V_o$ as is, and the latter is referred to as a "sensor own vehicle velocity $V_{osen}$" to distinguish as described below.

The angular velocity sensor 16 outputs a voltage corresponding to a yaw rate (yaw angle velocity) of the navigation device. The yaw angle measurement unit 131 measures a yaw angle (e.g. a rotation angle in left and right directions based on the traveling direction of the vehicle) based on the voltage measured per predetermined timing and outputted from the angular velocity sensor 16. The own vehicle position estimating unit 132 estimates an own vehicle position and an own vehicle azimuth based on the moving distance measured by the distance measurement unit 130 and the yaw angle measured by the yaw angle measurement unit 131.

In addition, the own vehicle position $P_o$ calculated by the above own vehicle position calculating unit 126 and the own vehicle position estimated by the own vehicle position estimating unit 132 are equal in terms of that calculation targets (estimation targets) are the own vehicle positions. However, the former is referred to as the own vehicle position $P_o$ as is, and the latter is referred to as a "sensor own vehicle position" to distinguish as described below.

In addition, the own vehicle azimuth calculated by the own vehicle velocity calculating unit 127 and the own vehicle azimuth estimated by the own vehicle position estimating unit 132 are equal in terms of that calculation targets (measurement targets) are the own vehicle azimuths. However, the former is referred to as the own vehicle azimuth as is, and the latter is referred to as a "sensor own vehicle azimuth" to distinguish as described below.

Figure 11:
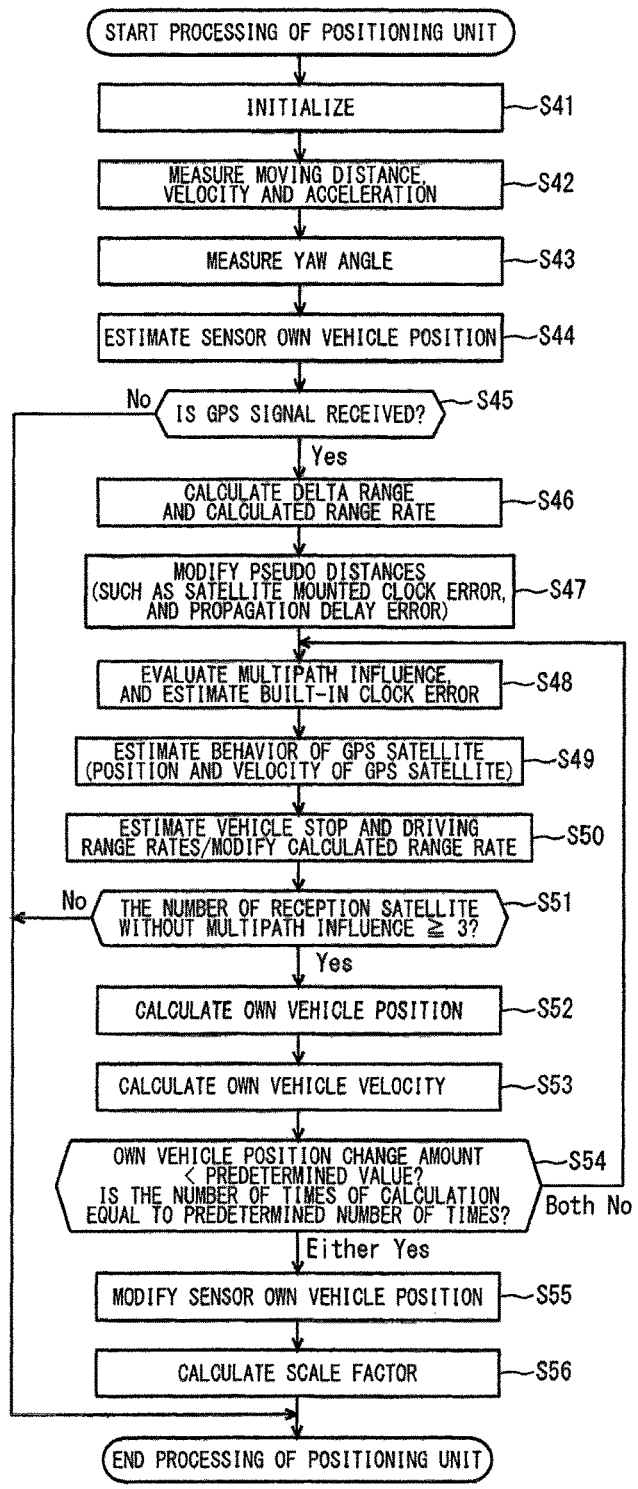
FIG. 11 is a flowchart showing an operation of the navigation device according to the third embodiment.

Next, an operation of the navigation device in FIG. 10 will be described with reference to the flowchart in FIG. 11 showing positioning processing performed by the positioning unit 12 per processing cycle. In addition, in the following description of the operation, the same portions as those in the second embodiment will not be described in detail and differences will be described.

In step S41, the navigation device initializes information which needs to be initialized for current positioning processing among information obtained by previous positioning processing. In addition, this initialization may be optionally performed when initialization is required immediately after a power source is activated.

In step S42, the distance measurement unit 130 multiplies a scale factor on the pulse number of the velocity sensor 15 measured per predetermined timing to measure a moving distance per predetermined timing. In addition, a scale factor obtained in step S56 in previous positioning processing is used for a scale factor.

Further, in same step S42, the distance measurement unit 130 makes the pulse number of each predetermined timing pass through a low pass filter, and measures the sensor own vehicle velocity $V_{osen}$ and acceleration along the traveling direction of the vehicle obtained thereby per predetermined timing.

In step S43, the yaw angle measurement unit 131 measures a yaw angle based on the output voltage, a zero voltage and a sensitivity, of the angular velocity sensor 16 measured per predetermined timing.

In step S44, the own vehicle position estimating unit 132 calculates a moving amount of the own vehicle (the change amount of the own vehicle position) in the horizontal direction (a direction on a xy plane) based on the moving distance measured in step S42 by the distance measurement unit 130 and the yaw angle measured in step S43 by the yaw angle measurement unit 131. Further, the own vehicle position estimating unit 132 adds the moving amount to the sensor own vehicle position calculated in the previous positioning processing to estimate the sensor own vehicle position of current positioning processing. Furthermore, the own vehicle position estimating unit 132 updates the currently estimated sensor own vehicle position as a sensor own vehicle position to which the moving amount needs to be added in next positioning processing. In addition, the sensor own vehicle position estimated by the own vehicle position estimating unit 132 is modified (in step S55 described below in this case) based on the own vehicle position $P_o$ calculated by the own vehicle position calculating unit 126.

After step S44, the same operations as those in above step S22 to step S24 (see FIG. 9) are performed in step S45 to step S47. Further, after step S47, the positioning unit 12 performs convergence calculation on the own vehicle position based on the Raw data by performing loop processing in step S48 to step S54 in one positioning processing similar to the second embodiment. Next, an operation of each step of this loop processing will be described.

In step S48, a built-in clock error estimating unit 123 and an occurred multipath evaluating unit 128 perform the same processing as that in above step S25. Further, in step S49, a GPS satellite behavior estimating unit 124 performs the same processing as that in above step S26.

In step S50, the range rate estimating unit 125 estimates a vehicle stop range rate $\Delta\rho_{rate-s}(t_i)$ Meanwhile, in the third embodiment, the range rate estimating unit 125 estimates the vehicle stop range rate $\Delta\rho_{rate-s}(t_i)$ by using the sensor own vehicle position and the sensor own vehicle azimuth estimated by the own vehicle position estimating unit 132, instead of using the own vehicle position $P_o$ (the own vehicle position $P_o$ based on a transmission signal) calculated by the own vehicle position calculating unit 126.

More specifically, for all reception satellites, the range rate estimating unit 125 estimates the vehicle stop range rate $\Delta\rho_{rate-s}(t_i)$ by applying to above equation (5) the positions $P_s$ and the velocities $V_s$ (the positions $P_s$ and the velocities $V_s$ of GPS satellites based on transmission signals) of GPS satellites estimated by the GPS satellite behavior estimating unit 124 and the sensor own vehicle position and the sensor own vehicle azimuth estimated by the own vehicle position estimating unit 132.

Further, for a GPS satellite which is determined not to be influenced by a multipath (a change in a built-in clock error is equal to or less than a predetermined value) in above step S48, the range rate estimating unit 125 estimates the above vehicle stop range rate $\Delta\rho_{rate-s}(t_i)$ and modifies the calculated range rate $\Delta\rho_{rate}(t_i)$ to obtain the modified range rate $\Delta\rho_{rate}'(t_i)$ similar to the first embodiment.

Meanwhile, for a GPS satellite which is determined to be influenced by a multipath (a change in a built-in clock error is greater than a predetermined value) in above step S48, the range rate estimating unit 125 estimates the above vehicle stop range rate $\Delta\rho_{rate-s}(t_i)$ and estimates a third range rate $\Delta\rho_{rate-m}(t_i)$ in case that the vehicle is assumed to be driving unlike the first embodiment.

That is, for a GPS satellite which is determined to be influenced by a multipath in above step S48, the range rate estimating unit 125 estimates the third range rate $\Delta\rho_{rate-m}(t_i)$ (referred to as "driving range rate $\Delta\rho_{rate-m}(t_i)$" below) by applying to following equation (9) the position $P_s$ and the velocity $V_s$ estimated by the GPS satellite behavior estimating unit 124, the sensor own vehicle position and the sensor own vehicle azimuth estimated by the own vehicle position estimating unit 132 and the sensor own vehicle velocity $V_{osen}$ measured by the distance measurement unit 130. In addition, as is clear upon comparison with above equation (5), this equation (9) is the same as equation (5) except that components of sensor own vehicle velocities $V_{osen}$ ($v_{osenx}$, $v_{oseny}$, $v_{osenz}$) are included.

[Mathematical 9]

$$\Delta\rho_{rate-m}(t_i) \text{LOS}_x \cdot (V_{sx}-V_{osenx}) + \text{LOS}_y \cdot (V_{sy}-V_{oseny}) + \text{LOS}_z \cdot (V_{sz}-V_{osenz}) \quad (9)$$

Where,
$\Delta\rho_{rate-m}(t_i)$: Driving range rate [m/s]
$V_{osen}$: Sensor own vehicle velocity ($v_{osenx}$, $v_{oseny}$, $V_{osenz}$) [m/s]

After step S50, the same operations as those in above step S28 and step S29 (see FIG. 9) are performed in step S51 and step S52.

In step S53, the own vehicle velocity calculating unit 127 calculates the own vehicle velocities $V_o$ ($v_{ox}$, $v_{oy}$, $v_{oz}$) based on at least one of the modified range rate $\Delta\rho_{rate}'(t_i)$ and the driving range rate $\Delta\rho_{rate-m}(t_i)$, and the vehicle stop range rate $\Delta\rho_{rate-s}(t_i)$.

More specifically, for a GPS satellite which is determined not to be influenced by a multipath in step S48, the own vehicle velocity calculating unit 127 calculates the own vehicle velocities $V_o$ ($v_{ox}$, $v_{oy}$, $v_{oz}$) by applying to above equation (8) the above navigation matrix A, the vehicle stop range rate $\Delta\rho_{rate-s}(t_i)$ and the modified range rate $\Delta\rho_{rate}'(t_i)$ similar to the first embodiment.

Meanwhile, for a GPS satellite which is determined to be influenced by a multipath in step S48, the own vehicle velocity calculating unit 127 calculates the own vehicle velocities $V_o$ ($v_{ox}$, $v_{oy}$, $v_{oz}$) by using the driving range rate $\Delta\rho_{rate-m}(t_i)$ estimated by the range rate estimating unit 125, instead of the modified range rate $\Delta\rho_{rate}'(t_i)$ unlike the first embodiment. More specifically, the own vehicle velocity calculating unit 127 calculates the own vehicle velocities $V_o$ ($v_{ox}$, $v_{oy}$, $v_{oz}$) by applying to following equation (10) the above navigation matrix A, the vehicle stop range rate $\Delta\rho_{rate-s}(t_i)$ and the driving range rate $\Delta\rho_{rate-m}(t_i)$.

[Mathematical 10]

$$V_o = (A^T W A)^{-1} (A^T W) \times \begin{vmatrix} \Delta\rho_{rate-m1} - \Delta\rho_{rate-s1} \\ \Delta\rho_{rate-m2} - \Delta\rho_{rate-s2} \\ \vdots \\ \Delta\rho_{rate-mn} - \Delta\rho_{rate-sn} \end{vmatrix} \quad (10)$$

Wherein,
$V_o$: Own vehicle velocity ($v_{ox}$, $v_{oy}$, $v_{oz}$) [m/s]

In addition, although not expressed in equation (8) and equation (10), when the own vehicle velocity calculating unit 127 is configured as described above, equations including the driving range rate $\Delta\rho_{rate-m}(t_i)$ and the modified range rate $\Delta\rho_{rate}'(t_i)$ in a mixed fashion in equation (8) and equation (10) are used in step S48.

Figure 12:
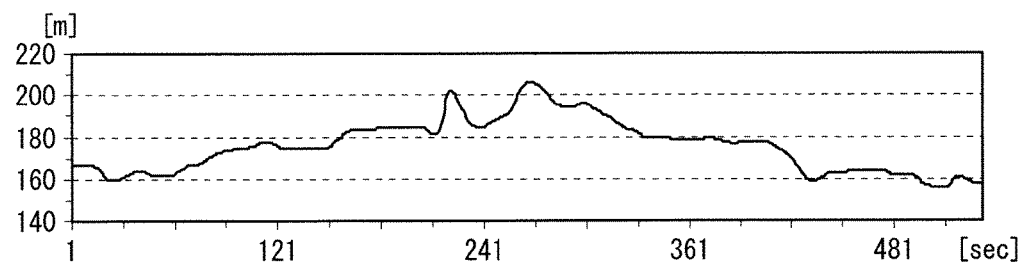
FIG. 12 is a view showing a result obtained by the navigation device according to the third embodiment.
Figure 13:
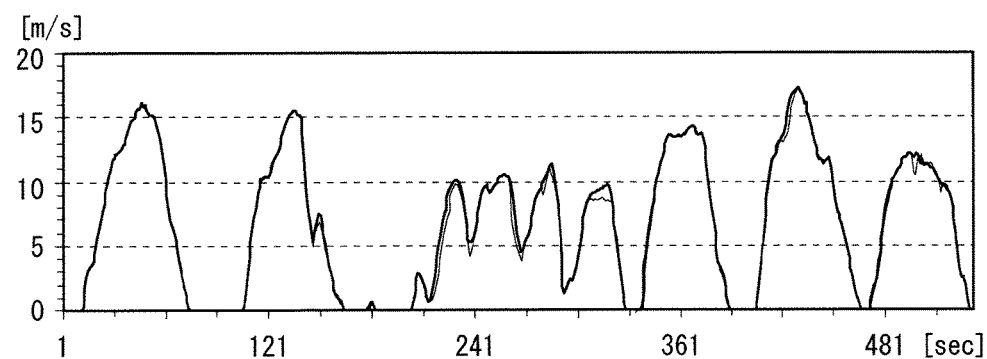
FIG. 13 is a view showing a result obtained by the navigation device according to the third embodiment.
Figure 14:
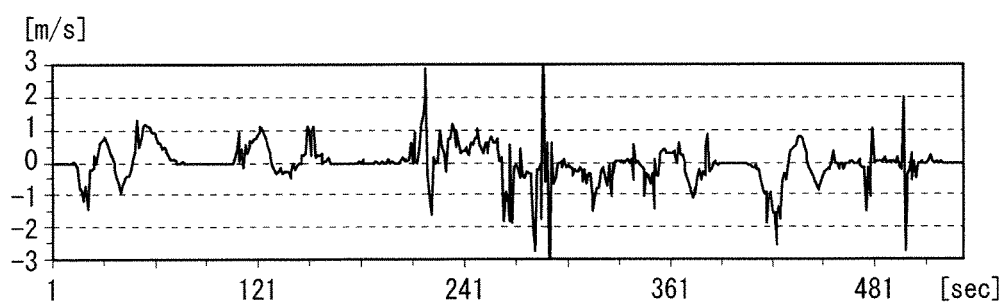
FIG. 14 is a view showing a result obtained by the navigation device according to the third embodiment.

FIGS. 12 to 14 are views showing examples of results obtained by the navigation device according to the third embodiment. FIG. 12 is a view showing a GPS altitude observed in a course which starts from a flat road, goes up a slope, circles around at a top of a hill, goes down the hill and returns to the original road. FIG. 13 is a view showing a velocity measured by the velocity sensor 15 as a bold solid line, and a horizontal component (a synthetic vector of $v_{ox}$ and $v_{oy}$) of the own vehicle velocities $V_o$ calculated by the own vehicle velocity calculating unit 127 as a thin solid line in the same course as that in FIG. 12. FIG. 14 is a view showing the velocity $V_{oz}$ in a vertical direction among the own vehicle velocities $V_o$ calculated by the own vehicle velocity calculating unit 127 in the same course as that in FIG. 12. As shown in FIG. 13, when a change in the GPS altitude is a little, the velocity (bold solid line) of the velocity sensor 15 and the horizontal component (thin solid line) of the own vehicle velocities $V_o$ calculated by the own vehicle velocity calculating unit 127 substantially match.

In step S54 (FIG. 11), the positioning unit 12 determines whether or not the own vehicle position $P_o$ converges in current positioning processing similar to above step S31 (FIG. 9).

In step S55, (that is, when the number of reception satellites which are determined in step S51 not to be influenced by a multipath is three or more and after it is determined in step S54 that the own vehicle positions $P_o$ converge), the own vehicle position estimating unit 132 modifies the sensor own vehicle position estimated in step S44 by the own vehicle position estimating unit 132, based on the own vehicle positions $P_o$ calculated in step S52 by the own vehicle position calculating unit 126. Details of such own vehicle position estimation processing are disclosed in, for example, Japanese Patent No. 3321096, and may be used in the present invention.

Then, in step S56 (that is, after it is determined in step S51 that there is no multipath influence), the scale factor calculating unit 129 calculates a scale factor based on magnitudes of the own vehicle velocities $V_o$ (a magnitude of a synthetic vector of $v_{ox}$, $v_{oy}$ and $v_{oz}$) calculated by the own vehicle velocity calculating unit 127 and the pulse number of the pulse signal outputted from velocity sensor 15.

In this regard, the scale factor calculating unit 129 according to the third embodiment determines whether or not the own vehicle performs predetermined driving (whether or not the vehicle is driving on a sloped road and driving at a low speed) based on the own vehicle velocities $V_o$ calculated by the own vehicle velocity calculating unit 127. For example, the scale factor calculating unit 129 determines that the own vehicle is driving on the sloped road when an absolute value of the velocity $v_{oz}$ in the vertical direction among the own vehicle velocities $V_o$ calculated by the own vehicle velocity calculating unit 127 is equal to or larger than a predetermined value. Further, in addition to this determination, the scale factor calculating unit 129 determines that the own vehicle is driving at a low speed when the magnitudes of the own vehicle velocities $V_o$ (a synthetic vector of $v_{ox}$, $v_{oy}$ and $v_{oz}$) are equal to or less than a predetermined value. Furthermore, the scale factor calculating unit 129 calculates the above scale factor when determining that the own vehicle is not driving on a sloped road or the own vehicle is not driving at a low speed. In addition, details of processing of calculating a scale factor are disclosed in, for example, Japanese Patent No. 3321096, and may be used in the present invention.

When step S56 is finished, current positioning processing is finished.

The navigation device according to the above third embodiment estimates the vehicle stop range rate $\Delta\rho_{rate-s}(t_i)$ by using the sensor own vehicle position and the sensor own vehicle azimuth estimated by the own vehicle position estimating unit 132, instead of using the own vehicle positions $P_o$ calculated by the own vehicle position calculating unit 126. Consequently, it is possible to increase accuracy of the own vehicle velocity $V_o$. Further, even when radio waves from GPS satellites are shielded by an architecture around an own vehicle and can only be intermittently received, it is possible to calculate the own vehicle velocity $V_o$.

Further, in the third embodiment, the driving range rate $\Delta\rho_{rate-m}(t_i)$ is used instead of the modified range rate $\Delta\rho_{rate}'(t_i)$ which is influenced more or less by a multipath for reception satellites which are determined to be influenced by a multipath (a change in a built-in clock error is greater than a predetermined value) among a plurality of reception satellites. Consequently, even when a built-in clock error is insufficiently modified under environment of a strong multipath influence, it is possible to accurately calculate the own vehicle velocity $V_o$. In addition, although a case where the number of reception satellites is plural has been described above, the number of reception satellites is not limited to this, and the same may apply to one reception satellite. That is, the driving range rate $\Delta\rho_{rate-m}(t_i)$ may be used instead of the modified range rate $\Delta\rho_{rate}'(t_i)$ which is influenced more or less by a multipath when one reception satellite is determined to be influenced by a multipath.

Further, in the third embodiment, when the number of GPS satellites which are determined not to be influenced by a multipath (a change in a built-in clock error is equal to or less than a predetermined value) is equal to or more than a predetermined number (three in this case), a scale factor is calculated based on the own vehicle velocity $V_o$ calculated by the own vehicle velocity calculating unit 127 and the pulse signal outputted from the velocity sensor 15. Consequently, it is possible to suppress a multipath influence upon calculation of a scale factor. Therefore, it is possible to increase accuracy to calculate a scale factor and eventually increase accuracy to calculate an acceleration of the distance measurement unit 130. In addition, although a case where the number of reception satellites is plural has been described above, the number of reception satellites is not limited to this, and the same may apply to one reception satellite. That is, when one reception satellite is determined not to be influenced by a multipath, a scale factor may be calculated based on the own vehicle velocity $V_o$ calculated by the own vehicle velocity calculating unit 127 and the pulse signal outputted from the velocity sensor 15.

Further, in the third embodiment, it is determined whether or not the own vehicle drives on a sloped road and at a low speed which decrease accuracy to calculate a scale factor based on the own vehicle velocity $V_o$, and, when it is determined that the own vehicle is not driving on the sloped road and at a low speed, the scale factor is calculated. It is possible to increase accuracy to calculate a scale factor and eventually increase accuracy to measure an acceleration of the distance measurement unit 130.

In addition, the scale factor calculating unit 129 may calculate a scale factor under certain conditions even when the vehicle is driving on a sloped road and at a low speed. For example, the scale factor calculating unit 129 performs weighted averaging, depending on a converged state of a calculated value of the scale factor, and changes a correction level according to the converged state of the scale factor. Further, even when the own vehicle is driving on a sloped road and at a low speed, if the correction level is equal to or larger than a predetermined level (the scale factor is highly likely to converge), the scale factor calculating unit 129 may change a weight of the scale factor to calculate the scale factor.

Although the scale factor calculating unit 129 determines that the own vehicle is driving on the sloped road when an absolute value of the velocity $v_{oz}$ in the vertical direction among the own vehicle velocities $V_o$ is equal to or larger than a predetermined value in the above description, the scale factor calculating unit 129 is not limited to this. For example, the scale factor calculating unit 129 may determine that the own vehicle is driving on the sloped road when the absolute value of a pitch angle (an angle formed between the traveling direction of the vehicle and the xy plane) which can be calculated based on the velocity in the horizontal direction among the own vehicle velocities $V_o$ (the magnitude of the synthetic vector $v_{ox}$ and $v_{oy}$) and the velocity $v_{oz}$ in the vertical direction is equal to or larger than a predetermined value.

Further, although the scale factor calculating unit 129 determines that the own vehicle is driving at a low speed when the magnitude of the velocity $V_o$ is equal to or less than a predetermined value, the scale factor calculating unit 129 is not limited to this. For example, the scale factor calculating unit 129 may determine that the own vehicle is driving at a low speed when the sensor own vehicle velocity $V_{osen}$ measured by the distance measurement unit 130 is equal to or less than a predetermined value.

<Fourth Embodiment>

Figure 15:
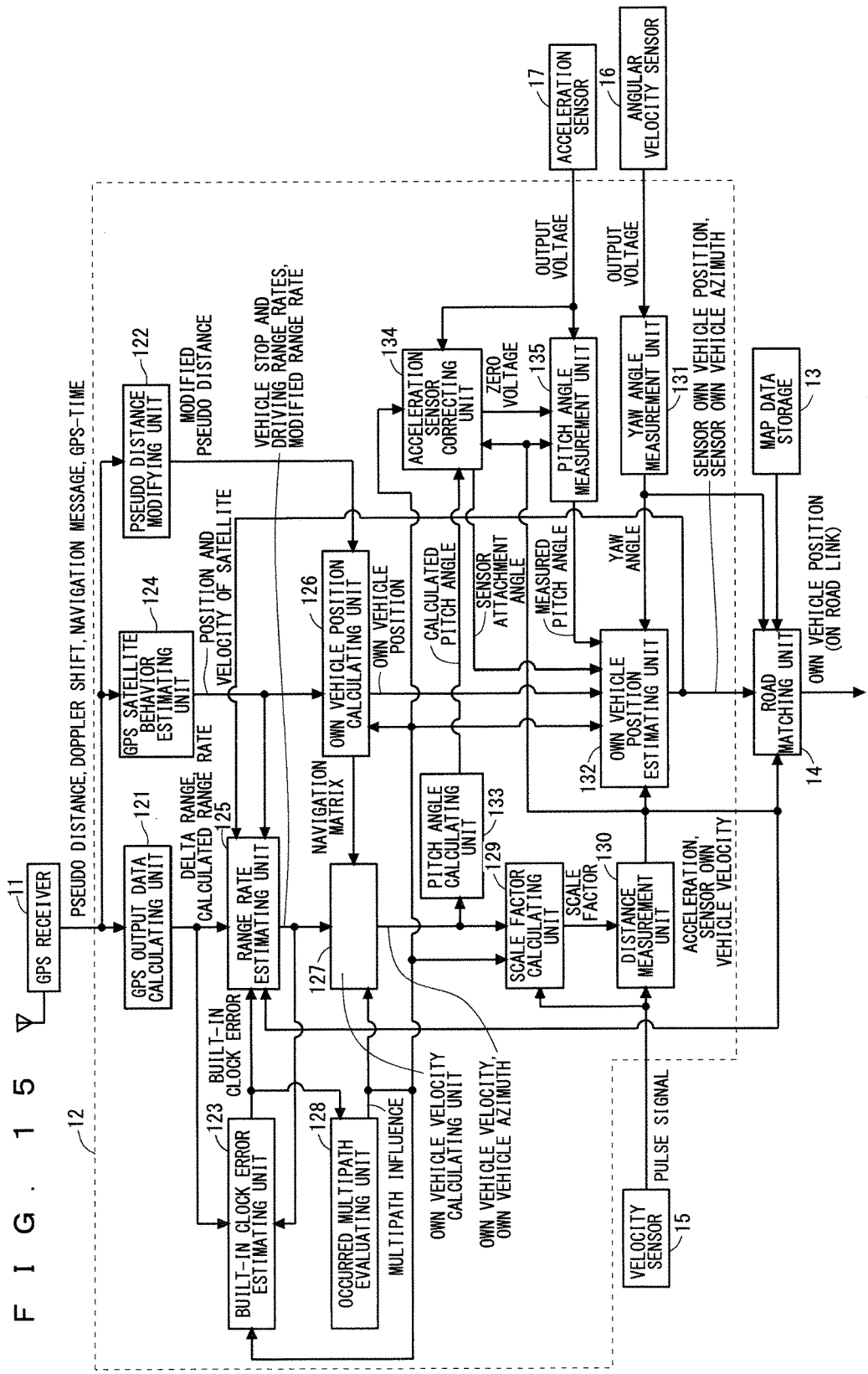
FIG. 15 is a block diagram showing a configuration of a navigation device according to a fourth embodiment.

FIG. 15 is a block diagram showing a configuration required to measure an own vehicle position in a configuration of a navigation device according to a fourth embodiment of the present invention. The fourth embodiment is expanded from the third embodiment, and therefore the same portions as those in the third embodiment will not be described and differences will be mainly described.

The navigation device shown in FIG. 15 employs a configuration where an acceleration sensor 17 is added outside a positioning unit 12 of the navigation device shown in FIG. 10, and a pitch angle calculating unit 133, an acceleration sensor correcting unit 134 and a pitch angle measurement unit 135 are added inside the positioning unit 12.

The acceleration sensor 17 provided with a sensor detection axis in a traveling direction of an own vehicle outputs a voltage corresponding to an acceleration (second acceleration) along the traveling direction of the navigation device, to the acceleration sensor correcting unit 134 per predetermined timing. In addition, strictly speaking, not only a voltage corresponding to the acceleration along the traveling direction but also a voltage corresponding to a gravitational acceleration and a zero voltage corresponding to an attachment error of the acceleration sensor 17 to the vehicle are added to the voltage outputted from by the acceleration sensor 17.

The pitch angle calculating unit 133 calculates a first pitch angle related to the vehicle per predetermined timing based on own vehicle velocities $V_o$ ($v_{ox}$, $v_{oy}$, $v_{oz}$) calculated by the own vehicle velocity calculating unit 127, and outputs the first pitch angle to the acceleration sensor correcting unit 134 per the predetermined timing. The first pitch angle calculated by the pitch angle calculating unit 133 is referred to as a "calculated pitch angle" below.

The acceleration sensor correcting unit 134 corrects the zero voltage of the acceleration sensor 17 based on the acceleration from the distance measurement unit 130, the output voltage from the acceleration sensor 17 and the calculated pitch angle from the pitch angle calculating unit 133, and calculates a sensor attachment angle with respect to the traveling direction of the vehicle based on the zero voltage. Further, the acceleration sensor correcting unit 134 outputs the corrected zero voltage to the pitch angle measurement unit 135 per predetermined timing, and outputs the sensor attachment angle to the own vehicle position estimating unit 132 per the predetermined timing.

In this regard, as described with reference to step S42 (FIG. 11) in the third embodiment, the distance measurement unit 130 measures an acceleration (first acceleration) along the traveling direction of the vehicle per predetermined timing, and this acceleration is obtained by applying a low pass filter to this acceleration. Hence, a delay time due to the low pass filter is occurred in the acceleration measured by the distance measurement unit 130. Therefore, the time axis of the acceleration measured by the distance measurement unit 130 is delayed more or less from the time axis of the calculated pitch angle calculated by the pitch angle calculating unit 133 and the time axis of the output voltage outputted from the acceleration sensor 17. As a result, there is a problem that correction accuracy of the acceleration sensor correcting unit 134 deteriorates more or less.

Then, the acceleration sensor correcting unit 134 according to the fourth embodiment makes the output voltage from the acceleration sensor 17 and the calculated pitch angle from the pitch angle calculating unit 133 pass through the low pass filter (not shown) such that the time axis of the output voltage from the acceleration sensor 17 and the time axis of the calculated pitch angle from the pitch angle calculating unit 133 align with the time axis (delayed time axis) of the acceleration from the distance measurement unit 130. Further, the acceleration sensor correcting unit 134 corrects the zero voltage of the acceleration sensor 17 based on the acceleration from the distance measurement unit 130, the output voltage from the acceleration sensor 17 and the calculated pitch angle from the pitch angle calculating unit 133, with the time axes of the acceleration, the output voltage and the calculated pitch angle aligned by the low pass filter.

The pitch angle measurement unit 135 measures a second pitch angle related to a vehicle based on the acceleration from the distance measurement unit 130, the output voltage from the acceleration sensor 17 and the zero voltage from the acceleration sensor correcting unit 134. The second pitch angle calculated by the pitch angle calculating unit 135 is referred to as a "measured pitch angle" below.

In this regard, the above zero voltage is corrected based on, for example, the output voltage which is made to pass through the low pass filter as described above. Consequently, the time axis of the zero voltage corrected by the acceleration sensor correcting unit 134 and the time axis of the acceleration measured by the distance measurement unit 130 are aligned. However, these time axes are still delayed from a time axis of the output voltage from the acceleration sensor 17. As a result, similar to the above, there is a problem that measurement accuracy of the pitch angle measurement unit 135 deteriorates more or less.

Then, the pitch angle measurement unit 135 according to the fourth embodiment makes the output voltage from the acceleration sensor 17 pass through the low pass filter (not shown) such that the time axis of the output voltage from the acceleration sensor 17 aligns with the time axis (delayed time axis) of the acceleration from the distance measurement unit 130 and the time axis (delayed time axis) of the zero voltage from the acceleration sensor correcting unit 134. Further, the pitch angle measurement unit 135 measures the measured pitch angle based on the acceleration from the distance measurement unit 130, the output voltage from the acceleration sensor 17 and the zero voltage from the acceleration sensor correcting unit 134, with the time axes of the acceleration, the output voltage and the zero voltage aligned by the low pass filter.

Figure 16:
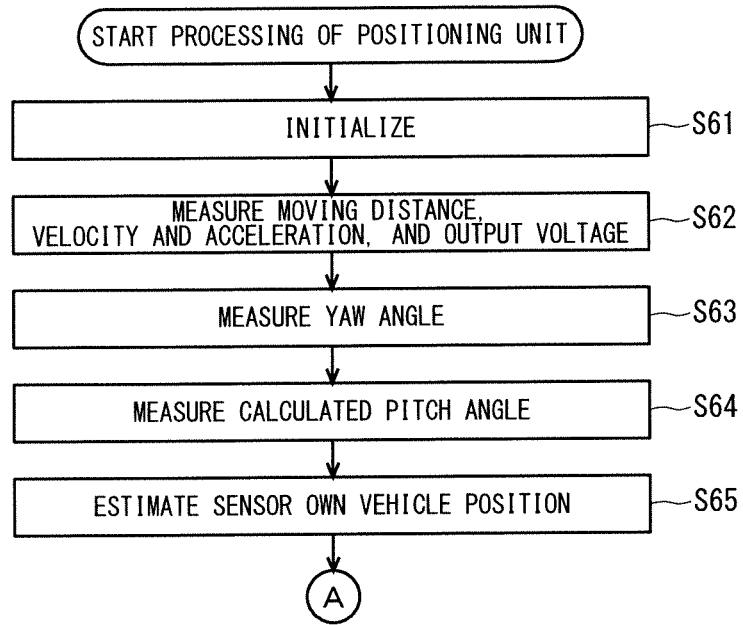
FIG. 16 is a flowchart showing an operation of the navigation device according to the fourth embodiment.

Next, an operation of the navigation device in FIG. 15 will be described with reference to the flowcharts in FIGS. 16 and 17 showing positioning processing performed by the positioning unit 12 per processing cycle. In addition, in the following description of the operation, the same portions as those in the third embodiment will not be described in detail and differences will be described.

First, the same operations as those in above step S41 to step S43 (see FIG. 11) are performed in step S61 to step S63. In this regard, in step S62, in addition to the operation in step S42, i.e., measurement of a moving distance, a sensor own vehicle velocity $V_{osen}$ and an acceleration by the distance measurement unit 130, the acceleration sensor 17 outputs a voltage corresponding to an acceleration along the traveling direction of the navigation device.

In step S64, the pitch angle measurement unit 135 makes the voltage outputted in step S62 by the acceleration sensor 17 pass through the above low pass filter. Further, in same step S64, pitch angle measurement unit 135 measures the measured pitch angle per predetermined timing based on the acceleration from the distance measurement unit 130, the output voltage from the acceleration sensor 17 and the zero voltage from the acceleration sensor correcting unit 134 (e.g. the zero voltage corrected in step S79 in previous positioning processing), with the time axes of the acceleration, the output voltage and the zero voltage aligned.

An equation for calculating a measured pitch angle is disclosed in, for example, Japanese Patent No. 4443621, and may be used in the present invention. FIG. 18 shows an example of a measured pitch angle measured by the pitch angle measurement unit 135 for the same data as those in FIGS. 12 to 14 used to describe the third embodiment.

After step S64, in step S65 (FIG. 16), the own vehicle position estimating unit 132 corrects a decrease in a sensitivity of a yaw angle of the yaw angle measurement unit 131 accompanying an inclination of a detection axis of the angular velocity sensor 16, based on the measured pitch angle measured per predetermined timing and outputted from the pitch angle measurement unit 135 and an sensor attachment angle from the acceleration sensor correcting unit 134. In addition to the correction, the own vehicle position estimating unit 132 calculates a moving amount of the own vehicle (the change amount of the own vehicle position) in the horizontal direction (a direction on a xy plane) based on the moving distance measured in step S62 and the yaw angle measured in step S63 similar to above step S44 (FIG. 11), and estimates the sensor own vehicle position. In addition, correcting for a yaw angle accompanying an inclination of a detection axis of an angular velocity sensor and calculating a moving distance in the horizontal direction are disclosed in, for example, Japanese Patent No. 4443621, and may be used in the present invention.

Figure 17:
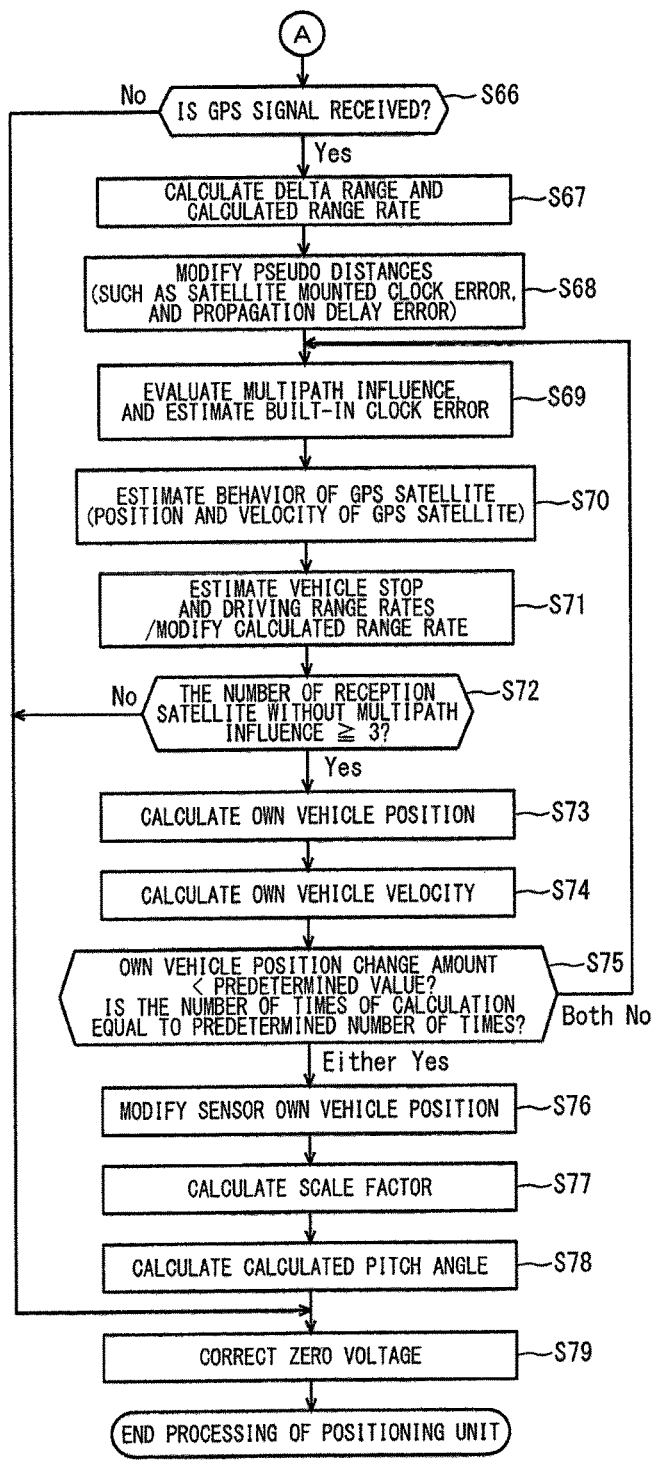
FIG. 17 is a flowchart showing the operation of the navigation device according to the fourth embodiment.

After step S65, the same operations as those in above step S45 to step S56 (see FIG. 11) are performed in step S66 to step S77 shown in FIG. 17.

In step S78 (i.e., when the number of reception satellites which are determined in step S72 not to be influenced by a multipath is three or more and after it is determined in step S75 that the own vehicle positions $P_o$ converge), the pitch angle calculating unit 133 calculates a calculated pitch angle $\theta_{pit-g}$ expressed by following equation (11) based on a horizontal velocity (a magnitude of a synthetic vector of $v_{ox}$ and $v_{oy}$) and the velocity $v_{oz}$ in the vertical direction of the own vehicle velocities $V_o$ calculated by the own vehicle velocity calculating unit 127.

{Mathematical 11}

$$\theta_{pit-g} = \tan^{-1} \frac{v_{oz}}{\sqrt{v_{ox}^2 + v_{oy}^2}} \qquad (11)$$

Where,
$\theta_{pit-g}$: Calculated pitch angle [rad]

In step S79, the acceleration sensor correcting unit 134 determines that an own vehicle is driving at a low speed in case that the magnitude of the sensor own vehicle velocity $V_{osen}$ from the distance measurement unit 130 (alternatively, the magnitudes of the own vehicle velocities $V_o$) is equal to or less than a predetermined value, and determines that the own vehicle is driving on a sloped road when an absolute value of the calculated pitch angle $\theta_{pit-g}$ from the pitch angle calculating unit 133 is equal to or larger than a predetermined value.

Further, in same step S79 (i.e. after it is determined in step S72 that there is no multipath influence), when determining that the own vehicle is not driving at a low speed and is not driving on a stop lane, the acceleration sensor correcting unit 134 makes the output voltage from the acceleration sensor 17 and the calculated pitch angle $\theta_{pit-g}$ from the pitch angle calculating unit 133 pass through the above low pass filter. Furthermore, the acceleration sensor correcting unit 134 corrects the zero voltage of the acceleration sensor 17 based on the acceleration from the distance measurement unit 130, the output voltage from the acceleration sensor 17 and the calculated pitch angle $\theta_{pit-g}$ from the pitch angle calculating unit 133, with the time axes of the acceleration, the output voltage and the calculated pitch angle aligned.

In addition, the acceleration sensor correcting unit 134 according to the fourth embodiment is configured to correct a zero voltage at a cycle shorter than a cycle to observe GPS satellites. More specifically, the acceleration sensor correcting unit 134 recognizes that a sloped road has a fixed inclination in a GPS observation cycle, and corrects the zero voltage of the acceleration sensor 17 at a sensor measurement timing which is a cycle shorter than the GPS observation cycle. In addition, the acceleration sensor correcting unit 134 calculates the above sensor attachment angle from the zero voltage of the acceleration sensor 17. However, this calculating method is disclosed in, for example, Japanese Patent No. 4443621, and may be used in the present invention.

When step S79 is finished, current positioning processing is finished.

The above navigation device according to the fourth embodiment aligns time axes of information required to correct the zero voltage in the acceleration sensor correcting unit 134. Consequently, it is possible to stably and more accurately correct a zero voltage.

In addition, the acceleration sensor correcting unit 134 according to the fourth embodiment is configured not to correct a zero voltage upon driving on a sloped road and upon low speed driving similar to calculation of a scale factor described in the third embodiment. Consequently, it is possible to prevent a decrease in accuracy to correct a zero voltage, and increase accuracy of a pitch angle. Further, when an absolute value of the calculated pitch angle $\theta_{pit-g}$ is equal to or larger than a predetermined value, it is determined that an own vehicle is driving on a sloped road as described above. However, performing determination is not limited to this, and, when the absolute value of the velocity $v_{oz}$ in the vertical direction among the own vehicle velocities $V_o$ is equal to or larger than a predetermined value, it may be determined that an own vehicle is driving on a sloped road.

Further, in the fourth embodiment, time axes of information required to measure a measured pitch angle in the pitch angle measurement unit 135 are aligned. Consequently, it is possible to stably and more accurately measure a measured pitch angle.

Further, in the fourth embodiment, it is possible to correct a zero voltage at a sensor measurement timing, and reduce a time required for this correction.

In addition, the embodiments of the present invention can be freely combined within the scope of the invention or optionally modified or omitted.

REFERENCE SIGNS LIST

15 Velocity Sensor
16 Angular Velocity Sensor
17 Acceleration Sensor
121 GPS Output Data Calculating Unit
123 Built-in Clock Error Estimating Unit
125 Range Rate Estimating Unit
127 Own Vehicle Velocity Calculating Unit
128 Occurred Multipath Evaluating Unit
129 Scale Factor Calculating Unit
130 Distance Measurement Unit
131 Yaw Angle Measurement Unit
132 Own Vehicle Position Estimating Unit
133 Pitch Angle Calculating Unit
134 Acceleration Sensor Correcting Unit
135 Pitch Angle Measurement Unit

The invention claimed is:

1. A navigation method that displays a position of a moving body on a map for destination guidance, comprising:
   storing map data including linear shapes and road links represented by coordinate points;
   receiving, by a GPS receiver, transmission signals from at least one GPS satellite at predefined time periods;
   obtaining raw GPS data from the received transmission signals;
   determining a moving body position by
      calculating a delta range of said at least one GPS satellite based on a difference between a pseudo distance for a GPS satellite received from a current transmission signal and a pseudo distance for the GPS satellite received from the previous transmission signal from the GPS satellite and a first range rate of said at least one GPS satellite based on a Doppler shift of said transmission signal;
      estimating a built-in clock error of a built-in clock of said moving body based on a difference between said calculated delta range of said at least one GPS satellite and said calculated first range rate of said at least one GPS satellite;
      estimating a second range rate, assuming that said moving body has stopped at the current time period, based on position and velocity of said GPS satellite determined from said current transmission signal and a position of said moving body;
      modifying said calculated first range rate based on said built-in clock error; and
      calculating a first velocity of said moving body related to three axial directions that form an orthogonal coordinate system, based on a navigation matrix, said second range rate and said modified first range rate, where said navigation matrix includes the position of said at least one GPS satellite based on said current transmission signal and includes the position of said moving body; and
   outputting the position of the moving body to a display, the display configured to display the position of the moving body on a map based on a road link read from the stored map data.

2. The navigation method according to claim 1, wherein determining the moving body position further comprises
   determining whether or not a change in the built-in clock error is larger than a predetermined value; and
   estimating the built-in clock error used for modifying said calculated first range rate by excluding or lowering a weight of the built-in clock error in which the change is determined to be larger than said predetermined value.

3. The navigation method according to claim 2, wherein when the GPS receiver receives transmission signals from a plurality of GPS satellites, determining the moving body position comprises
   calculating a plurality of delta ranges, each delta range corresponding to a respective one of the plurality of GPS satellites;
   calculating a plurality of said first range rates, each first range rate corresponding to a respective one of the plurality of GPS satellites;
   estimating a built-in clock error based on each of said plurality of GPS satellites, the built-in clock error for each GPS satellite being based on a difference between said calculated delta range of the respective GPS satellite and said calculated first range rate of the respective GPS satellite;
   determining whether or not a change in the built-in clock error for each of the plurality of GPS satellites is larger than a predetermined value; and
   determining an average built-in clock error based on the estimated built-in clock errors for the plurality of GPS satellites, excluding or lowering a weight of said estimated built-in clock errors for the GPS satellites in which the change is determined to be larger than said predetermined value.

4. The navigation method according to claim 1, further comprising:
   receiving, from a velocity sensor, a pulse signal corresponding to moving distance of said moving body;
   determining whether or not said moving body performs predetermined driving based on said calculated first velocity; and
   calculating, when it is determined that the moving body does not perform the predetermined driving, a scale factor based on the calculated first velocity and the pulse signal received from said velocity sensor.

5. The navigation method according to claim 1, further comprising
   determining whether or not a change in the built-in clock error is larger than the predetermined value;
   receiving, from a velocity sensor, a pulse signal corresponding to a moving distance of said moving body; and
   calculating, when it is determined that a change in said built-in clock error is equal to or less than a predetermined value, a scale factor based on said first calculated velocity and the pulse signal received from said velocity sensor.

6. The navigation method according to claim 5, wherein when the GPS receiver receives transmission signals from a plurality of GPS satellites, determining the moving body position comprises calculating a plurality of delta ranges, each delta range corresponding to a respective one of said plurality of GPS satellites, calculating a plurality of first range rates each first range rate corresponding to a respective one of said plurality of GPS satellites, estimating a plurality of built-in clock errors, each built-in clock error corresponding to a respective one of said plurality of GPS satellites, determining whether or not changes in said plurality of built-in clock errors are larger than the predetermined value, and calculating, when a number of said GPS satellites whose changes in said built-in clock errors are determined to be equal to or less than said predetermined value is equal to or more than a predetermined number, said scale factor based on said calculated first velocity and the pulse signal received from said velocity sensor.

7. The navigation method according to claim 1, further comprising:

receiving, from a velocity sensor, a pulse signal corresponding to a moving distance of said moving body;

receiving, from an acceleration sensor, a voltage corresponding to a second acceleration along said traveling direction of said moving body;

calculating a scale factor based on said calculated first velocity and the pulse signal received from said velocity sensor;

measuring a first acceleration in a traveling direction of said moving body based on said pulse signal received from said velocity sensor and said scale factor;

calculating a first pitch angle based on said calculated first velocity; and correcting a zero voltage of said acceleration sensor based on said first acceleration, said voltage, and said first pitch angle, time axes of said first acceleration, said voltage and said first pitch angle being aligned.

8. The navigation method according to claim 7, further comprising measuring a second pitch angle based on said first acceleration, said voltage from said acceleration sensor, and said zero voltage, time axes of said first acceleration, said voltage and said zero voltage being aligned.

9. The navigation method according to claim 8, further comprising correcting said zero voltage at a cycle shorter than an observation cycle of said GPS satellite.

10. The navigation method according to claim 1, wherein when the GPS receiver receives transmission signals from a plurality of GPS satellites, determining the moving body position comprises calculating a plurality of delta ranges, each delta range corresponding to a respective one of said plurality of GPS satellites, calculating a plurality of first range rates, each first range rate corresponding to a respective one of the plurality of GPS satellites, estimating a plurality of built-in clock errors, each built-in clock error corresponding to a respective one of said plurality of GPS satellites, determining whether or not changes in said plurality of built-in clock errors are equal to or larger than a predetermined value, estimating said second range rate and modifying said first range rate for each of said GPS satellites whose changes in said built-in clock errors are determined to be smaller than said predetermined value, and estimating said second and third range rates for each of said GPS satellites whose changes in said built-in clock errors are determined to be larger than said predetermined value, and calculating said first velocity based on at least one of said modified first range rates and said third range rate, and said second range rate.

11. A global positioning method that determines a position of a moving body, comprising:

storing map data;

receiving, by a GPS receiver, transmission signals from at least one GPS satellite at predefined time periods;

obtaining raw GPS data from the received transmission signals; and determining a moving body position by calculating a delta range of said at least one GPS satellite based on a difference between a pseudo distance for a GPS satellite received from a current transmission signal and a pseudo distance for the GPS satellite received from the previous transmission signal from the GPS satellite and a first range rate of said at least one GPS satellite based on a Doppler shift of said transmission signal;

estimating a built-in clock error of a built-in clock of said moving body based on a difference between said calculated delta range of said at least one GPS satellite and said calculated first range rate of said at least one GPS satellite;

estimating a second range rate, assuming that said moving body has stopped at the current time period, based on position and velocity of said GPS satellite determined from said current transmission signal and a position of said moving body;

modifying said calculated first range rate based on said built-in clock error;

calculating a first velocity of said moving body related to three axial directions that form an orthogonal coordinate system, based on a navigation matrix, said second range rate and said modified first range rate, where said navigation matrix includes the position of said at least one GPS satellite based on said current transmission signal and includes the position of said moving body; and outputting the position of the moving body to identify the position of the moving body on a map, wherein said position of the moving body on the map is output to outside a global positioning device.

12. A global positioning method according to claim 11, further comprising determining whether or not a change in the built-in clock error is larger than a predetermined value; and estimating the built-in clock error used for modifying said calculated first range rate by excluding or lowering a weight of the built-in clock error in which the change is determined to be larger than said predetermined value.

13. A global positioning method according to claim 12, wherein when the GPS receiver receives transmission signals from a plurality of GPS satellites, determining the moving body position comprises calculating a plurality of delta ranges, each delta range corresponding to a respective one of the plurality of GPS satellites;

calculating a plurality of said first range rates, each first range rate corresponding to a respective one of the plurality of GPS satellites;

estimating a built-in clock error based on each of said plurality of GPS satellites, the built-in clock error for each GPS satellite being based on a difference between said calculated delta range of the respective GPS satellite and said calculated first range rate of the respective GPS satellite;

determining whether or not a change in the built-in clock error for each of the plurality of GPS satellites is larger than a predetermined value; and determining an average built-in clock error based on the estimated built-in clock errors for the plurality of GPS satellites, excluding or lowering a weight of said estimated built-in clock errors for the GPS satellites in which the change is determined to be larger than said predetermined value.

14. A global positioning method according to claim 11, further comprising:

receiving, from a velocity sensor, a pulse signal corresponding to moving distance of said moving body;

determining whether or not said moving body performs predetermined driving based on said calculated first velocity; and calculating, when it is determined that the moving body does not perform the predetermined driving, a scale factor based on the calculated first velocity and the pulse signal received from said velocity sensor.

15. A global positioning method according to claim 11, further comprising determining whether or not a change in the built-in clock error is larger than the predetermined value;

receiving, from a velocity sensor, a pulse signal corresponding to moving distance of said moving body; and calculating, when it is determined that a change in said built-in clock error is equal to or less than a predetermined value, a scale factor based on said first calculated velocity and the pulse signal received from said velocity sensor.

16. A global positioning method according to claim 15, wherein when the GPS receiver receives transmission signals from a plurality of GPS satellites, determining the moving body position comprises calculating a plurality of delta ranges, each delta range corresponding to a respective one of said plurality of GPS satellites, calculating a plurality of first range rates each first range rate corresponding to a respective one of said plurality of GPS satellites, estimating a plurality of built-in clock errors, each built-in clock error corresponding to a respective one of said plurality of GPS satellites, determining whether or not changes in said plurality of built-in clock errors are larger than the predetermined value, and calculating, when a number of said GPS satellites whose changes in said built-in clock errors are determined to be equal to or less than said predetermined value is equal to or more than a predetermined number, said scale factor based on said calculated first velocity and the pulse signal received from said velocity sensor.

17. method for identifying the position of a vehicle on a road link, comprising:

receiving, by a GPS receiver, transmission signals from at least one GPS satellite at predefined time periods;

obtaining raw GPS data from the received transmission signals; and determining a position of the vehicle by calculating a delta range of said at least one GPS satellite based on a difference between a pseudo distance for a GPS satellite received from a current transmission signal and a pseudo distance for the GPS satellite received from the previous transmission signal from the GPS satellite and a first range rate of said at least one GPS satellite based on a Doppler shift of said transmission signal;

estimating a built-in clock error of a built-in clock of said vehicle based on a difference between said calculated delta range of said at least one GPS satellite and said calculated first range rate of said at least one GPS satellite;

estimating a second range rate, assuming that said vehicle has stopped at the current time period, based on position and velocity of said GPS satellite determined from said current transmission signal and a position of said vehicle;

modifying said calculated first range rate based on said built-in clock error;

calculating a first velocity of said vehicle related to three axial directions that form an orthogonal coordinate system, based on a navigation matrix, said second range rate and said modified first range rate, where said navigation matrix includes the position of said at least one GPS satellite based on said current transmission signal and includes the position of said vehicle; and using the position of the vehicle to identify the position of the vehicle on a map.

18. The global positioning method according to claim 11, wherein the position of the moving body is output to a display, the display being configured to display the position of the moving body on the map based on a road link read from the stored map data.

19. The method according to claim 17, wherein the position of the vehicle is used by a display, the display being configured to display the position of the vehicle on a map based on a road link read from a stored map data.

20. A navigation method that displays a position of a moving body on a map for destination guidance, comprising:

storing map data including linear shapes and road links represented by coordinate points;

receiving, by a GPS receiver, transmission signals from at least one GPS satellite at predefined time periods;

obtaining raw GPS data from the received transmission signals;

determining a moving body position by calculating a delta range of said at least one GPS satellite based on a difference between a pseudo distance for a GPS satellite received from a current transmission signal and a pseudo distance for the GPS satellite received from the previous transmission signal from the GPS satellite and a first range rate of said at least one GPS satellite based on a Doppler shift of said transmission signal;

estimating a built-in clock error of a built-in clock of said moving body based on a difference between said calculated delta range of said at least one GPS satellite and said calculated first range rate of said at least one GPS satellite;

receiving, from a velocity sensor, a pulse signal corresponding to a moving distance of said moving body;

receiving, from an angular velocity sensor, a voltage corresponding to a yaw rate of said moving body;
calculating a scale factor based on said calculated first velocity and the pulse signal received from said velocity sensor;
measuring a moving distance of said moving body based on said pulse signal received from said velocity sensor and said scale factor;
determining a yaw angle based on the voltage received from said angular velocity sensor;
estimating a position and an azimuth of said moving body based on said measured moving distance and said yaw angle, and
estimating a second range rate, assuming that said moving body has stopped at the current time period, based on position and velocity of said GPS satellite determined from said current transmission signal, the estimated position, and the azimuth of said moving body;
modifying said calculated first range rate based on said built-in clock error; and
calculating a first velocity of said moving body related to three axial directions that form an orthogonal coordinate system, based on a navigation matrix, said second range rate and said modified first range rate, where said navigation matrix includes the position of said at least one GPS satellite based on said current transmission signal and includes the position of said moving body; and
outputting the position of the moving body to a display, the display configured to display the position of the moving body on a map based on a road link read from the stored map data.

21. A navigation method that displays a position of a moving body on a map for destination guidance, comprising:
storing map data including linear shapes and road links represented by coordinate points;
receiving, by a GPS receiver, transmission signals from at least one GPS satellite at predefined time periods;
obtaining raw GPS data from the received transmission signals;
determining a moving body position by
calculating a delta range of said at least one GPS satellite based on a difference between a pseudo distance for a GPS satellite received from a current transmission signal and a pseudo distance for the GPS satellite received from the previous transmission signal from the GPS satellite and a first range rate of said at least one GPS satellite based on a Doppler shift of said transmission signal;
estimating a built-in clock error of a built-in clock of said moving body based on a difference between said calculated delta range of said at least one GPS satellite and said calculated first range rate of said at least one GPS satellite;
receiving, from a velocity sensor, a pulse signal corresponding to a moving distance of said moving body;
receiving, from an angular velocity sensor, a voltage corresponding to a yaw rate of said moving body;
calculating a scale factor based on said calculated first velocity and the pulse signal received from said velocity sensor;
measuring a moving distance of said moving body based on said pulse signal received from said velocity sensor and said scale factor;
determining a yaw angle based on the voltage received from said angular velocity sensor;
estimating a position and an azimuth of said moving body based on said measured moving distance and said yaw angle, and
estimating a second range rate, assuming that said moving body has stopped at the current time period, based on position and velocity of said GPS satellite determined from said current transmission signal, the estimated position, and the azimuth of said moving body;
modifying said calculated first range rate based on said built-in clock error; and
calculating a first velocity of said moving body related to three axial directions that form an orthogonal coordinate system, based on a navigation matrix, said second range rate and said modified first range rate, where said navigation matrix includes the position of said at least one GPS satellite based on said current transmission signal and includes the position of said moving body;
determining a second velocity of said moving body based on said pulse signal received from said velocity sensor and said scale factor,
determining whether or not a change in said built-in clock error is equal to or larger than the predetermined value,
estimating, when said built-in clock error is determined to be larger than said predetermined value, a third range rate in case said moving body is driving, based on the position and the velocity of the at least one GPS satellite based on said transmission signal, the position and the azimuth of said moving body, and said second velocity, and
re-calculating, when said built-in clock error is determined to be larger than said predetermined value, said first velocity using said third range rate; and
outputting the position of the moving body to a display, the display configured to display the position of the moving body on a map based on a road link read from the stored map data.

22. A global positioning method that determines a position of a moving body, comprising:
storing map data;
receiving, by a GPS receiver, transmission signals from at least one GPS satellite at predefined time periods;
obtaining raw GPS data from the received transmission signals; and
determining a moving body position by
calculating a delta range of said at least one GPS satellite based on a difference between a pseudo distance for a GPS satellite received from a current transmission signal and a pseudo distance for the GPS satellite received from the previous transmission signal from the GPS satellite and a first range rate of said at least one GPS satellite based on a Doppler shift of said transmission signal;
estimating a built-in clock error of a built-in clock of said moving body based on a difference between said calculated delta range of said at least one GPS satellite and said calculated first range rate of said at least one GPS satellite;
receiving, from a velocity sensor, a pulse signal corresponding to a moving distance of said moving body;
receiving, from an angular velocity sensor, a voltage corresponding to a yaw rate of said moving body, calculating a scale factor based on said calculated first velocity and the pulse signal received from said velocity sensor;

measuring a moving distance of said moving body based on said pulse signal received from said velocity sensor and said scale factor;

determining a yaw angle based on the voltage received from said angular velocity sensor;

estimating a position and an azimuth of said moving body based on said measured moving distance and said yaw angle, estimating a second range rate, assuming that said moving body has stopped at the current time period, based on position and velocity of said GPS satellite determined from said current transmission signal, the estimated position, and the azimuth of said moving body;

modifying said calculated first range rate based on said built-in clock error;

calculating a first velocity of said moving body related to three axial directions that form an orthogonal coordinate system, based on a navigation matrix, said second range rate and said modified first range rate, where said navigation matrix includes the position of said at least one GPS satellite based on said current transmission signal and includes the position of said moving body;

determining a second velocity of said moving body based on said pulse signal received from said velocity sensor and said scale factor;

determining whether or not a change in said built-in clock error is equal to or larger than the predetermined value, estimating, when said built-in clock error is determined to be larger than said predetermined value, a third range rate in case said moving body is driving, based on the position and the velocity of the at least one GPS satellite based on said transmission signal, the position and the azimuth of said moving body, and said second velocity, and re-calculating, when said built-in clock error is determined to be larger than said predetermined value, said first velocity using said third range rate; and outputting the position of the moving body to identify the position of the moving body on a map, wherein said position of the moving body on the map is output to outside a global positioning device.

\* \* \* \* \*